US009752555B2

(12) United States Patent
Gdovic

(10) Patent No.: US 9,752,555 B2
(45) Date of Patent: Sep. 5, 2017

(54) SELF-STARTING SAVONIUS WIND TURBINE

(71) Applicant: Ronald Gdovic, Harrison City, PA (US)

(72) Inventor: Ronald Gdovic, Harrison City, PA (US)

( * ) Notice: Subject to any disclaimer, the term of this patent is extended or adjusted under 35 U.S.C. 154(b) by 702 days.

(21) Appl. No.: 13/786,762

(22) Filed: Mar. 6, 2013

(65) Prior Publication Data

US 2013/0287570 A1 Oct. 31, 2013

Related U.S. Application Data

(60) Provisional application No. 61/638,793, filed on Apr. 26, 2012.

(51) Int. Cl.
*F03D 3/00* (2006.01)
*F03D 3/02* (2006.01)
*F03D 3/04* (2006.01)

(52) U.S. Cl.
CPC .............. *F03D 3/005* (2013.01); *F03D 3/02* (2013.01); *F03D 3/04* (2013.01); *F03D 3/0418* (2013.01); *F05B 2240/213* (2013.01); *F05B 2250/30* (2013.01); *F05B 2250/70* (2013.01); *F05B 2280/40* (2013.01); *F05B 2280/4003* (2013.01); *Y02E 10/74* (2013.01)

(58) Field of Classification Search
CPC ...... F05B 2240/213; F03D 3/00; F03D 3/005; F03D 3/02; F03D 3/04–3/0418; Y02E 10/74; Y10S 416/09
USPC ....................... 416/197 R, 197 A; 290/44, 55
See application file for complete search history.

(56) References Cited

U.S. PATENT DOCUMENTS

| 1,764,052 | A | | 6/1930 | Pfeifer | |
|---|---|---|---|---|---|
| 2,007,963 | A | * | 7/1935 | Cleveland | ............... F03D 3/065 416/132 B |
| 2,252,523 | A | | 8/1941 | Plotkin | |
| 2,431,111 | A | | 11/1947 | Dubrie | |
| 2,436,747 | A | | 2/1948 | Dubrie | |
| 4,047,833 | A | | 9/1977 | Decker | |
| 4,455,491 | A | * | 6/1984 | Lanzrath | ................. F03D 3/068 290/44 |
| 4,830,570 | A | | 5/1989 | Benesh | |

(Continued)

FOREIGN PATENT DOCUMENTS

| FR | WO 2004063565 A1 | * | 7/2004 | ........... F03D 3/0418 |
|---|---|---|---|---|
| JP | WO 8103683 A1 | * | 12/1981 | ........... F03D 3/0409 |
| KR | 101157389 B1 | * | 6/2012 | ............. F03D 9/001 |

*Primary Examiner* — Laert Dounis
(74) *Attorney, Agent, or Firm* — The Webb Law Firm

(57) ABSTRACT

A self-starting Savonius wind turbine includes a frame, a rotor assembly that is rotatable about a central axis of rotation and an energy utilizing device operably connected to the rotor assembly. The rotor assembly has at least two rotors, each rotor having at least two rotor blades. Rotation of the rotor assembly is initiated by wind coming from any direction blowing on any one of the plurality of blades. The rotors are configured in a stacked orientation with the blades fixed at a rotated angular position relative to one another to start rotation of the rotor assembly in variable wind conditions. The rotor assembly is made of a composite laminate and the frame is made of a durable, lightweight material. The frame and the rotor assembly are assembled into a single unit for transportation and utilization.

4 Claims, 18 Drawing Sheets

(56) References Cited

U.S. PATENT DOCUMENTS

| | | | |
|---|---|---|---|
| 5,038,049 A | 8/1991 | Kato | |
| 5,336,933 A | 8/1994 | Ernster | |
| 5,454,694 A | 10/1995 | O'Dell | |
| 6,172,429 B1* | 1/2001 | Russell | F03D 9/008 290/4 R |
| 6,191,496 B1 | 2/2001 | Elder | |
| 6,538,340 B2 | 3/2003 | Elder | |
| 6,910,873 B2* | 6/2005 | Kaliski | F03D 3/005 416/119 |
| 6,966,747 B2* | 11/2005 | Taylor | F03D 3/0409 415/1 |
| 6,984,899 B1 | 1/2006 | Rice | |
| 7,242,108 B1 | 7/2007 | Dablo | |
| 7,381,030 B1* | 6/2008 | Vanderhye | F03D 3/005 416/146 R |
| 7,896,608 B2* | 3/2011 | Whitworth | F03D 3/02 415/4.2 |
| 8,174,135 B1 | 5/2012 | Roe | |
| 8,322,992 B2* | 12/2012 | Fuller | F03D 3/02 29/889.7 |
| 2007/0251090 A1* | 11/2007 | Breugel | B29C 70/30 29/889.7 |
| 2010/0092296 A1* | 4/2010 | Ferenczy | F03D 3/005 416/197 A |
| 2010/0219643 A1 | 9/2010 | Biucchi | |
| 2010/0296913 A1* | 11/2010 | Lee | F03D 3/02 415/4.2 |
| 2012/0119504 A1 | 5/2012 | Vigaev | |
| 2014/0367972 A1* | 12/2014 | Rhee | F03D 9/001 290/55 |

\* cited by examiner

SELF-STARTING SAVONIUS WIND TURBINE

CROSS-REFERENCE TO RELATED APPLICATIONS

This application claims the benefit of U.S. Provisional Application No. 61/638,793 filed on Apr. 26, 2012.

BACKGROUND

1. Field

The present disclosure relates generally to wind turbines and, more particularly, to a self-starting Savonius wind turbine.

2. Background

Windmills that harness wind energy using a plurality of exposed blades have been used both privately and commercially for some time. Such windmills often have a very high initial cost due to the cost of materials used, the cost required to transport the windmill, and time required to install components of the windmill. For example, windmills typically can be very heavy having a steel tower weighing over 2,500 pounds. Such large and heavy structures can be difficult to transport to an installation site. These large, heavy structures often require complex installation and require regular maintenance to ensure they operate at optimum performance. Additionally, one the windmill is erected, it is not intended to be moved to another location. Furthermore, traditional windmills are usually ineffective in variable wind conditions, such as wind coming from more than one direction during operation.

BRIEF SUMMARY

The disclosed self-starting Savonius wind turbine includes a frame and a rotor assembly that is rotatable about a central axis of rotation. The disclosed wind turbine is operable in a substantially vertical orientation and a substantially horizontal orientation. The rotor assembly has at least two rotors, each rotor having at least two rotor blades. Rotation of the rotor assembly is initiated by wind coming from any direction blowing on any one of the plurality of blades. The rotors are configured in a stacked orientation with the blades fixed at a rotated angular position relative to one another to start rotation of the rotor assembly in variable wind conditions, thus providing a smaller structure footprint and less environmental impact during use of the disclosed wind turbine. The frame and the rotor assembly are made of durable, cost effective, and lightweight materials advantageous to manufacturing, transportation, installation, and maintenance. The frame and the rotor assembly are assembled into a single unit, which leads to simpler transportation, installation, and utilization.

DETAILED DESCRIPTION OF THE DRAWINGS

Figure 1:
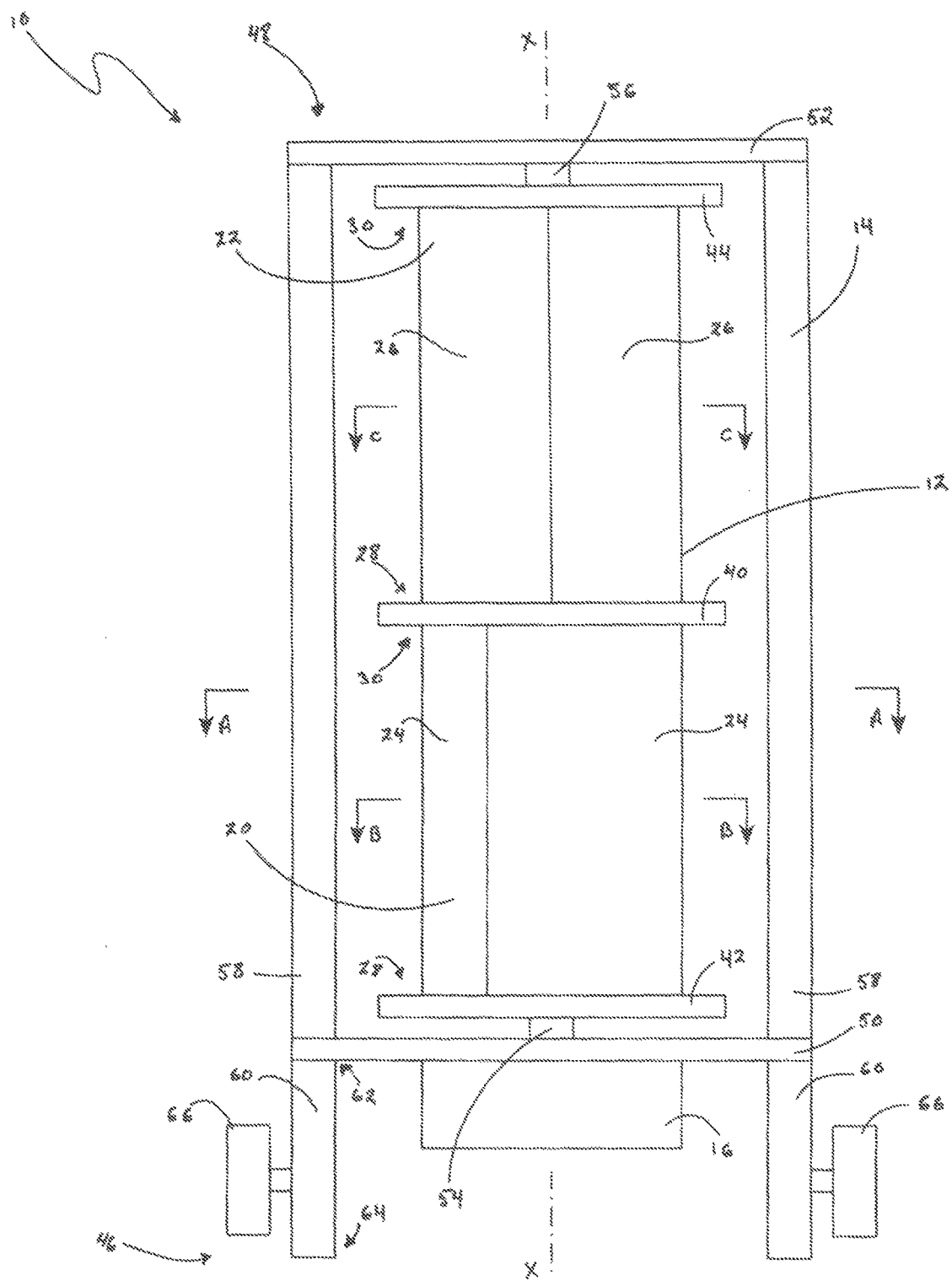
FIG. 1 is a side elevational view of an embodiment of the disclosed self-starting Savonius wind turbine, illustrated in a vertical orientation.

Referring to FIG. 1, one embodiment of the disclosed self-starting Savonius wind turbine, generally designated 10, includes a self-starting rotor assembly 12 having an axis of rotation X, a transportable frame 14 configured to rotatably support the rotor assembly 12 about the axis of rotation X, and an energy utilizing device 16 operably connected to the rotor assembly 12. The rotor assembly 12 includes at least a first rotor 20 and a second rotor 22, each of the rotors 20, 22 being rotatable about the axis of rotation X. The rotor assembly 12 is configured to rotate to start rotation upon wind having a sufficiently high velocity coming from any direction and blowing at the wind turbine 10. The wind turbine 10 is operable in a first, vertical, position with the axis of rotation X being substantially vertical, for example, when the wind turbine 10 is set upon a support surface, such as the ground, a roof of a building, or the like. The wind turbine 10 is also operable in a second, horizontal, position with the axis of rotation X being substantially horizontal, for example, when the wind turbine 10 is suspended from a support structure, such as a support frame, an eave or side wall of a building, or the like.

The first rotor 20 includes at least two substantially identical blades 24 and the second rotor 22 includes at least two substantially identical blades 26. Each of the blades 24, 26 of the first rotor 20 and the second rotor 22 includes a first end 28 and an opposed second end 30. The first rotor 20 and the second rotor 22 are operably connected together at a fixed orientation relative to one another. A partition disk 40 is interconnected between the second ends 30 of the blades 24 of the first rotor and the first ends 28 of the blades 26 of the second rotor 22. A first end disk 42 is connected to the first ends 28 of the blades 24 of the first rotor 20 and is rotatably connected to a first end 46 of the frame 14. A second end disk 44 is connected to the second ends 30 of the blades 26 of the second rotor 22 and rotatably connected to a second end 48 of the frame 14.

The frame 14 includes a first structure 50 positioned proximate (i.e., at or near) the first end 46 of the frame 14 and a second structure 52 positioned proximate the second end 48 of the frame 14. The structures 50, 52 can be any suitable structural end member. For example, each of the structures 50, 52 can be a solid panel, a plurality of interconnected panels, a plurality of interconnected or intersecting cross braces, or the like.

A first connector 54 is interconnected between the first structure 50 and the first end disk 42 along the axis of rotation X. The first connector 54 is configured to provide rotation of the first end disk 42, and thus the rotor assembly 12, relative to the first structure 52. A second connector 56 is interconnected between the second structure 52 and the second end disk 44 along the axis of rotation X. The second connector 54 is configured to provide rotation of the second end disk 44, and thus the rotor assembly 12, relative to the second structure 52. The connectors 54 can be any suitable rotational connector, such as a bearing connector.

The frame 14 also includes a plurality of frame members 58 interconnected between the first structure 50 and the second structure 52. The frame members 58 are disposed or otherwise positioned circumferentially around the rotor assembly 12. Each frame member 58 can be a single, elongated member or can be a plurality of interconnected frame segments.

The frame 14 also includes a plurality of supports 60, each of the plurality of supports 60 having a first end 62 connected to the first end 46 of the frame 14 and an opposed second end 64 extending away from the first end 46 of the frame 14. Each of the plurality of supports 60 can be positioned substantially perpendicular to the first structure 50 or can be positioned at an outward angle relative to the first structure (i.e., the second end 64 is farther away from the axis of rotation X than the first end 62). The second end 64 of each of the supports 60 can include a larger cross-sectional dimension than the first end 62 to provide a larger surface area for contact with the support surface when the wind turbine 10 is positioned in the first, vertical, position. For example, the second end 64 of the support 60 can include a foot, a flange, or the like.

The frame 14 can have various dimensions between the first end 46 and the second end 48. For example, the distance between the first end 46 and the second end 48 can range from about six feet to about eighty feet. In another example, the distance between the first end 46 and the second end 48 can range from about twenty feet to about sixty feet. In another example, the distance between the first end 46 and the second end 48 can range from about thirty feet to about forty-five feet. The distance between adjacent frame members 58 can be between about six feet and seven feet.

The energy utilizing device 16 can be any mechanical or electrical system designed to translate the rotational motion of the rotor assembly 12 provided by wind energy into another form of energy. In the illustrated example embodiment, the energy utilizing device 16 is positioned at the first end 46 of the frame 14. The energy utilizing device 16 and any associated electronic or electrical components and controls can be housed in a durable, water-proof enclosure attached to the first structure 50. The energy utilizing device 16 can, as an example, be an electrical generator having drive mechanism operably connected to the rotor assembly 12, such as a drive shaft, a chain, or a transmission connected to the first connector 54 to translate wind energy into electrical energy. The energy utilizing device 16 can, as another example, be a pump having a drive mechanism connected to the first connector 54 to translate wind energy into mechanical energy. Other types of energy utilizing devices 54 are also contemplated.

Figure 2:
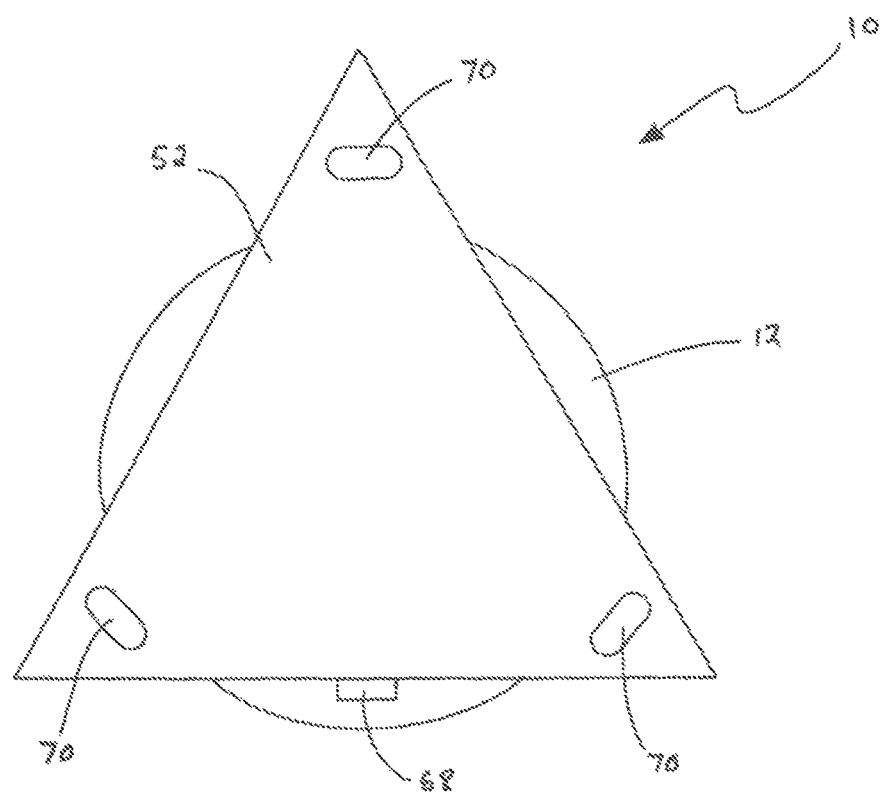
FIG. 2 is a top plan view of an embodiment of the disclosed self-starting Savonius wind turbine.
Figure 3:
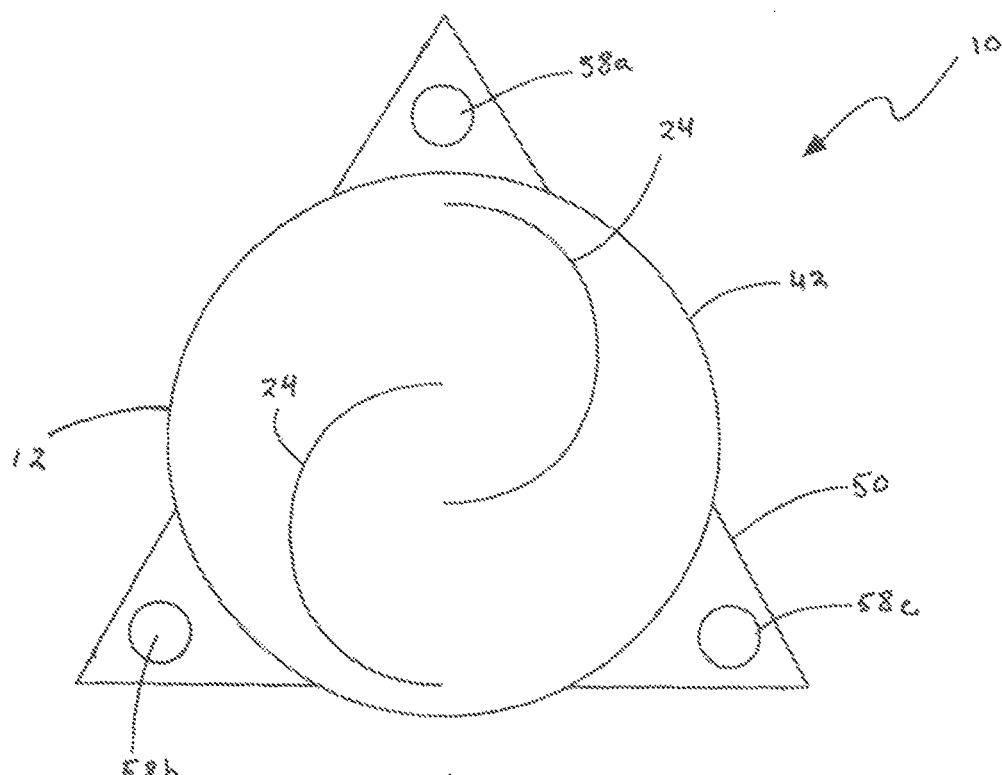
FIG. 3 is a cross-sectional view of the disclosed self-starting Savonius wind turbine, taken along section line A-A of FIG. 1.

Referring to FIGS. 2 and 3, in one example embodiment, the first structure 50 and the second structure 52 of the frame 14 each includes a substantially planar panel having at least a first corner, a second corner, and a third corner. For example, each of the structures 50, 52 can be an equilateral triangular-shaped panel. In other example embodiments, each of the structures 50, 52 can be a square-shaped panel having four corners, a circular-shaped panel, or a rectangular-shaped panel having four corners. Structures 50, 52 having other geometric shapes are also contemplated.

In the illustrated example embodiment, the plurality of frame members 58 includes at least a first frame member 58a interconnected between the first corners of the first 50 and second 52 structures, a second frame member 58b interconnected between the second corners of the first 50 and second 52 structures, and a third frame member 58c interconnected between the third corners of the first 50 and second 52 structures.

Figure 4:
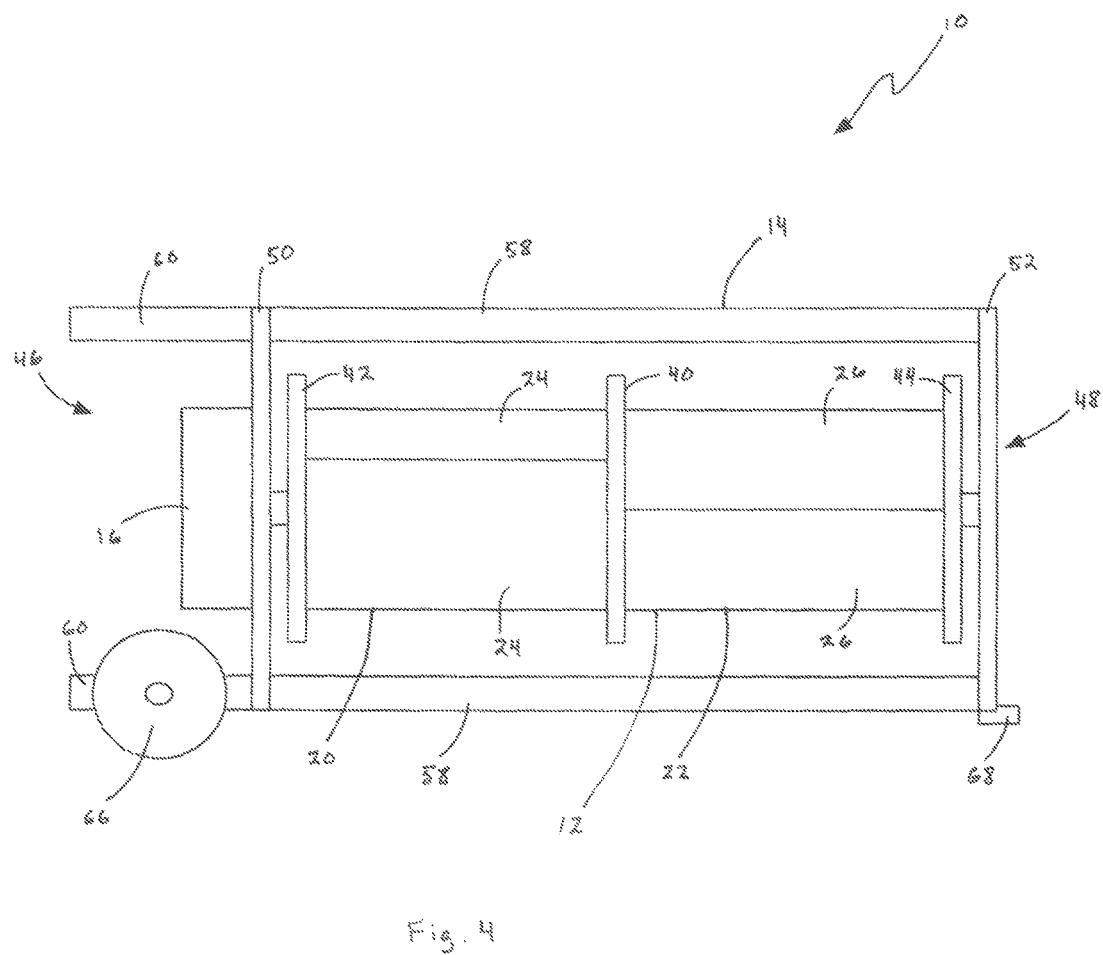
FIG. 4 is a side elevational view of the disclosed self-starting Savonius wind turbine, illustrated in a horizontal orientation.

Referring to FIGS. 1 and 4, the frame 14 is designed to be easily transportable between different locations. The frame 14 is suitably sized to fit, as a single, assembled unit, into a standard intermodal shipping container, such as an ISO container. The frame 14 is designed to also be towable, as a single, assembled unit, behind a tow vehicle. A pair of wheel assemblies 66 are rotatably attached to the frame 14 at or near the first end 46 of the frame 14. In one embodiment, each wheel assembly 66 can be rotatably connected to two opposing and parallel supports 60. Upon the wind turbine 10 being positioned in a first, horizontal, orientation with the first end 46 of the frame 14 and the second end 48 of the frame 14 being disposed substantially horizontally relative to one another (FIG. 4), the pair of wheel assemblies 66 are configured to be disposed upon a ground surface to allow transportation of the wind turbine 10 (i.e., towing). Upon the wind turbine 10 being positioned in a second, vertical, orientation with the first end 46 of the frame 14 and the second end 48 of the frame 14 being disposed substantially vertically relative to one another (FIG. 1), the pair of wheel assemblies 66 are configured to be disposed away from the ground surface.

A tow mount 68 can be operatively attached to the frame 14 away from the wheel assemblies 66, such as at the second end 48 of the frame 14. For example, as illustrated in FIG. 4, the tow mount can be attached to an edge of the second structure 52. The tow mount 68 can be any suitable tow hitch receiver configured to connect to a tow hitch or tow bar of a towing vehicle, such as a tow ball, a pin, a loop, or the like.

At least one fastener 70 is connected to the frame 14 at or near the second end 48 of the frame 14. The fasteners 70 are configured to provide contact points for connection to a lifting machine, such as a crane or hoist, to lift or lower the second end 48 of the frame 14 to position the wind turbine 10 between the first, horizontal, orientation and the second, vertical orientation. The fasteners 70 can also provide contact points for connection to an end of a guy wire 116 (FIG. 16) attached between the frame 14 and the support surface to stabilize the wind turbine 10 when utilized in the first, vertical, orientation. The fasteners 70 can also provide contact points for connection to an end of an anchor attached to the frame 14, such as a cantilever support beam, to stabilize the wind turbine 10 when utilized in the second, horizontal, orientation. The fasteners 70 can be any suitable mechanical fastener, such as a clevis fastener.

In the example embodiment illustrated in FIG. 2, three fasteners 70 are operably connected to the second structure 52 at or near the corners.

Figure 21:
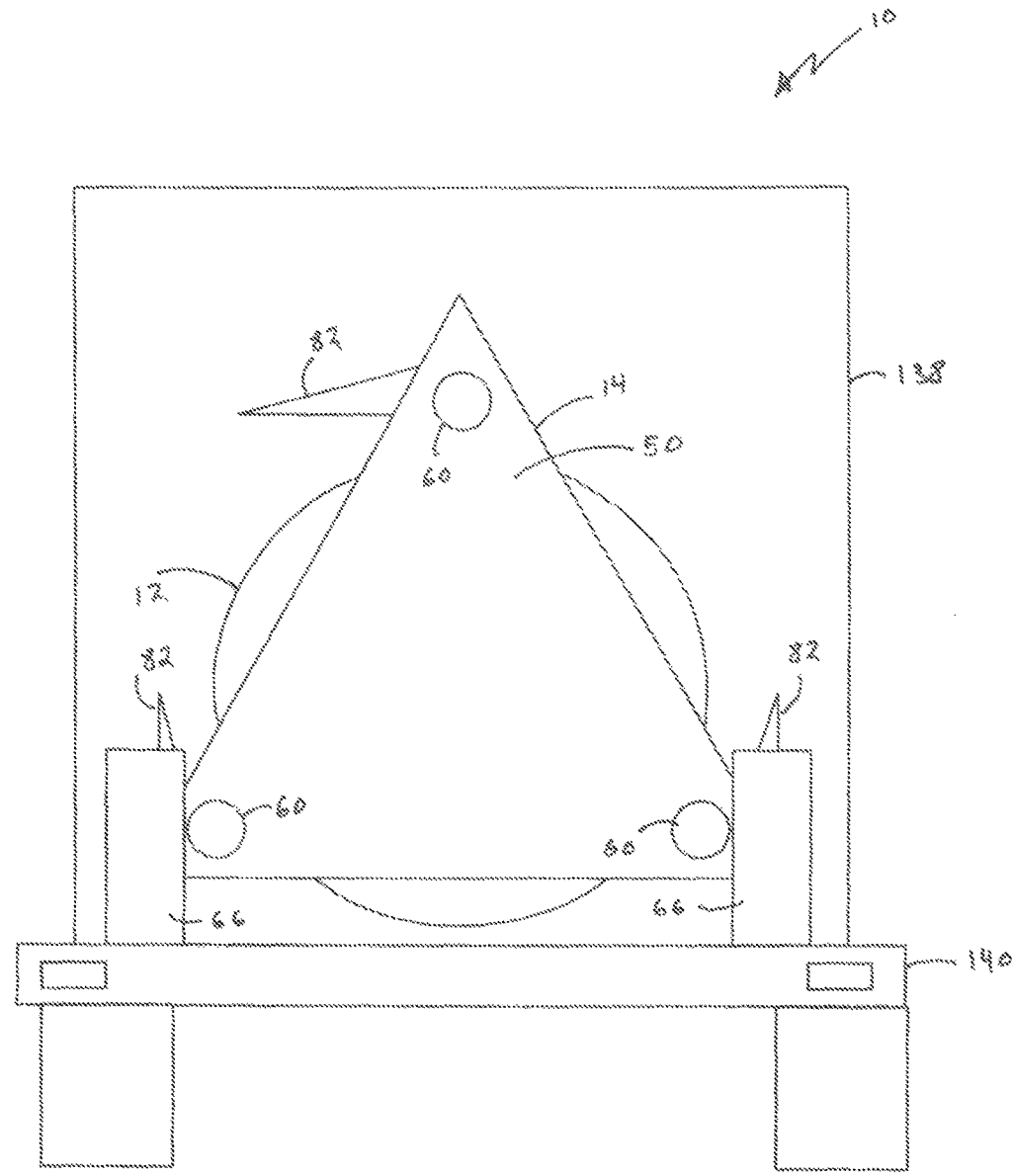
FIG. 21 is an end elevation view of the disclosed self-starting Savonius wind turbine, illustrated in the horizontal orientation during transportation.
Figure 24:
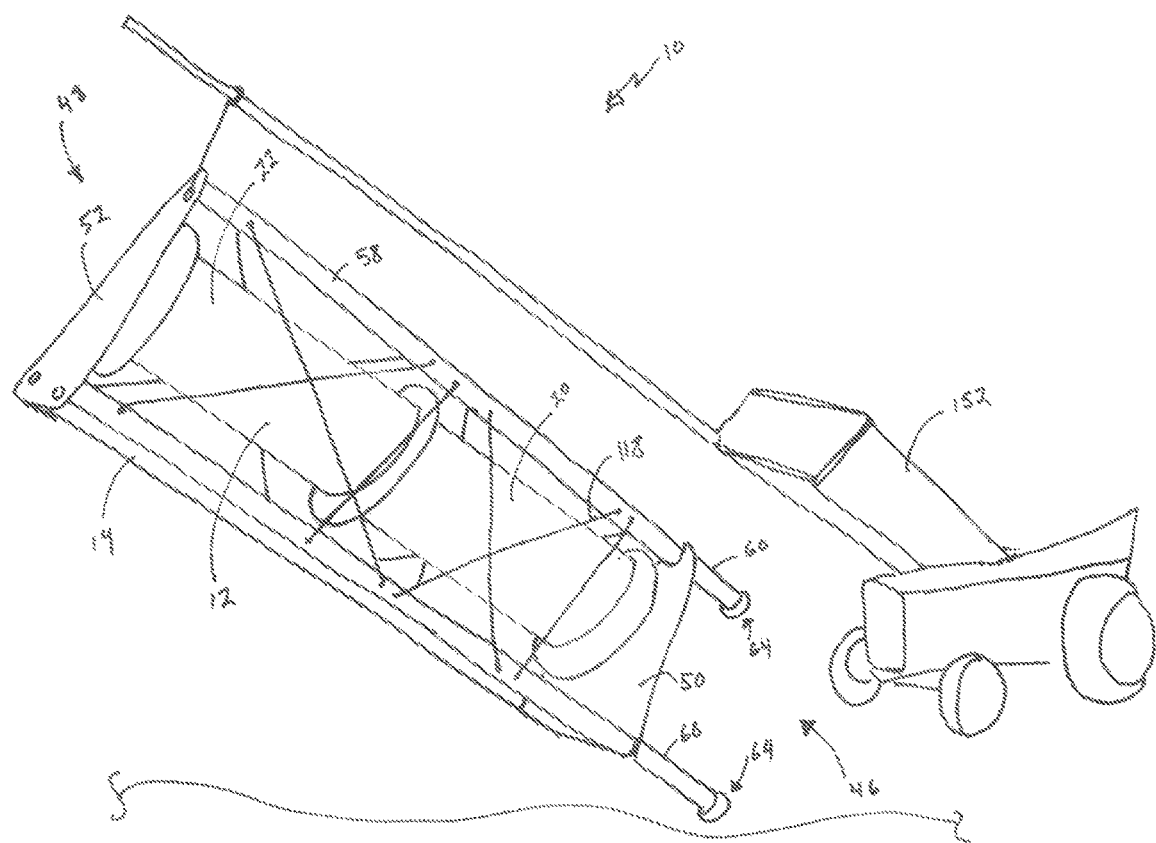
FIG. 24 is a side perspective view of the disclosed self-starting Savonius wind turbine, illustrating an example method of raising the wind turbine from the horizontal orientation to the vertical orientation.

Referring to FIG. 24, the wind turbine 10 can be transported to a utilization location in the horizontal orientation (FIG. 4) by way of being towed or by being carried within a shipping container (FIG. 21). Once at a desired location, the wind turbine 10 can be attached to the lifting machine 152 at the second end 48 of the frame 14. For example, working end of the lifting machine 152 can be connected to at least one of the fasteners 70. As illustrated in FIG. 24, the second end 48 of the frame 14 can be lifted away from the support surface (e.g., the ground). The second end 64 of at least one of the supports 60 can be stabilized upon the support surface. Lifting of the second end 48 of the frame 14 can be continued until the wind turbine 10 approaches the vertical orientation (FIG. 1). Upon raising the wind turbine 10 to the vertical orientation, the second ends 64 of all of the supports 60 can supported upon the support surface.

Figure 5:
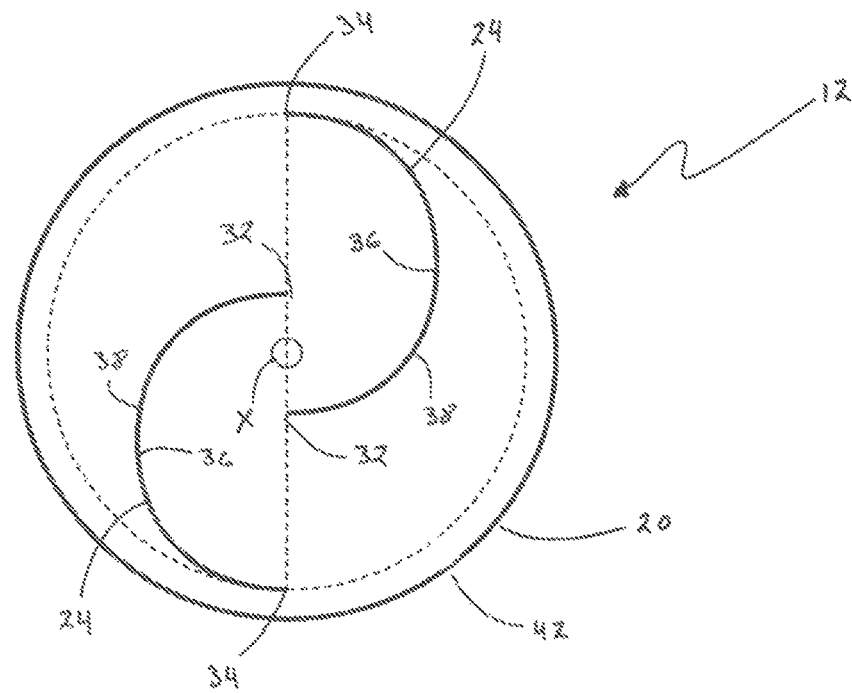
FIG. 5 is a cross-sectional view of the rotor assembly of the disclosed self-starting Savonius wind turbine, taken along section line B-B of FIG. 1.
Figure 6:
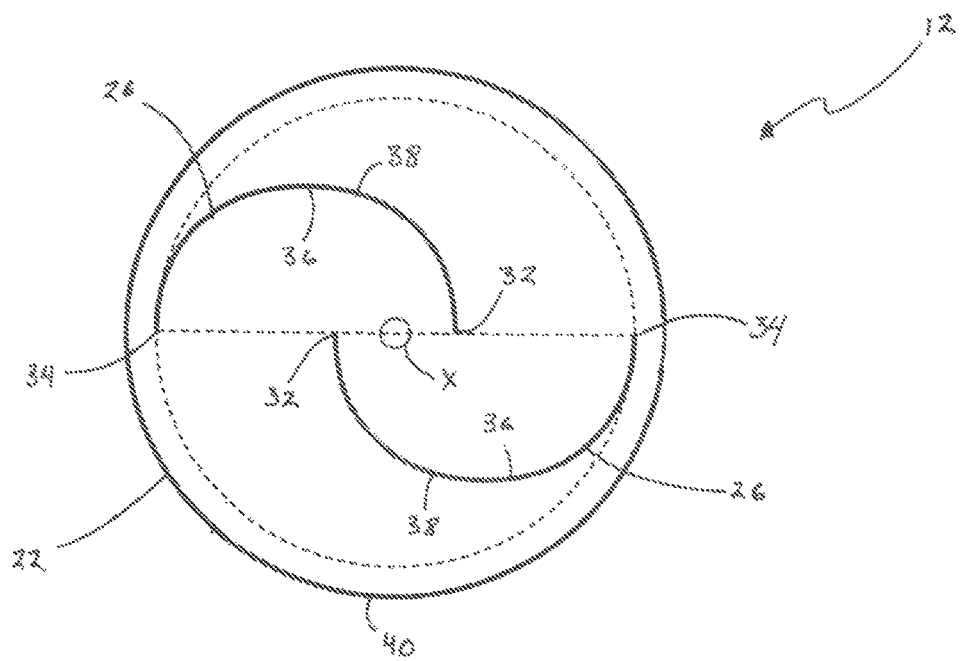
FIG. 6 is a cross-sectional view of the rotor assembly of the disclosed self-starting Savonius wind turbine, taken along section line C-C of FIG. 1.

Referring to FIGS. 5 and 6, each blade 24, 26 includes an inner edge 32 relative to the axis of rotation X and an outer edge 34 relative to the axis of rotation X. Each blade 24, 26 is configured to form a curved partially cylindrical shape having a substantially concave surface 36 and a substantially convex surface 38 extending between the inner edge 32 and the outer edge 34. The outer edges 34 of each of blade 24, 26 is being disposed farther away from the axis of rotation X than the inner edges 32. The rotor assembly 12 is configured to initiate rotation about the axis of rotation X by at least one blade 24 of the first rotor 20 acting upon the first end disk 42 and the partition disk 40 or by at least one blade 26 of the second rotor 22 acting upon the second end disk 44 and the partition disk 40.

As shown in FIG. 5, the outer edges 34 of the blades 24 of the first rotor 20 lie on a circle defining a diameter of the first rotor 20. One or both of the inner edges 32 and the outer edges 34 of the blades 24 of the first rotor 20 can be substantially parallel to the axis of rotation X. Alternatively, one or both of the inner edges 32 and the outer edges 34 of the blades 24 of the first rotor 20 can be at an angle relative to the axis of rotation X. In one embodiment, as illustrated in FIG. 5, the inner edges 32 and the outer edges 34 of the blades 24 of the first rotor 20 lie on a line 72 extending between the outer edges 34 of the blades 24. Alternatively, in another embodiment, the inner edges 32 may be spaced away from the line 72 extending between the outer edges 34 of the blades 24 toward the perimeter of the disks 40, 42, 44. For example, a straight line distance between the inner edges 32 of adjacent blades 24, 26 of the same rotor 20, 22 can range between about two inches and about eighteen inches. As another example, the straight line distance between the inner edges 32 of adjacent blades 24, 26 of the same rotor 20, 22 can range between about four inches and about twelve inches. As another example, the straight line distance between the inner edges 32 of adjacent blades 24, 26 of the same rotor 20, 22 can be about six inches.

As shown in FIG. 6, the outer edges of the blades 26 of the second rotor 22 lie on a circle defining a diameter of the second rotor 22. The inner edges 32 and the outer edges 34 of the blades 26 of the second rotor 22 also lie on a line 74 extending between the outer edges 34 of the blades 26. One or both of the inner edges 32 and the outer edges 34 of the blades 26 of the second rotor 22 can be substantially parallel to the axis of rotation X. Alternatively, one or both of the inner edges 32 and the outer edges 34 of the blades 26 of the second rotor 22 can be at an angle relative to the axis of rotation X.

In one embodiment, the diameter of the first rotor 20 and the diameter of the second rotor 22 are substantially the same. In another embodiment, the diameter of the first rotor 20 and the diameter of the second rotor 22 are substantially different. In one embodiment of the wind turbine, the diameters of the first rotor 20 and the second rotor 22 can be substantially less than a diameter of each of the first end disk 42, the second end disk 44, and the partition disk 40. For example, the diameter of the disks 40, 42, 44 can be between about four and about 12 inches larger than the diameter of the rotors 20, 22.

The diameters of the first rotor 20 and the second rotor 22 can vary to provide the concave surface 36 of each blade 24, 26 a suitable surface area sufficient to rotate the rotor assembly 12 upon wind having a sufficient velocity blowing on the concave surface 36. The diameter of the rotors 20, 22 is designed to initiate rotation of the rotor assembly 12 upon wind having a velocity of at least three miles per hour. For example, in one embodiment, the diameter of the rotors 20, 22 can range between about two feet and about fifteen feet. In another embodiment, the diameter of the rotors 20, 22 can range between about three feet and about ten feet. In another embodiment, the diameter of the rotors 20, 22 can be about five feet.

A straight line distance between the first end disk 42 and the partition disk 40 can be larger than the diameter of the first rotor 20. A straight line distance between the second end disk 44 and the partition disk 40 can be larger than the diameter of the second rotor 20. The straight line distance between the first end disk 42 and the partition disk 40 can be substantially the same as the straight line distance between the second end disk 44 and the partition disk 40. Alternatively, the straight line distance between the first end disk 42 and the partition disk 40 can be substantially different from the straight line distance between the second end disk 44 and the partition disk 40. For example, the straight line distance between an end disk 42, 44 and the partition disk 40 can range between about two and about twenty five feet. As another example, the straight line distance between an end disk 42, 44 and the partition disk 40 can range between about six and about twenty feet. As another example, the straight line distance between an end disk 42, 44 and the partition disk 40 can range between about ten and about fifteen feet.

Figure 7:
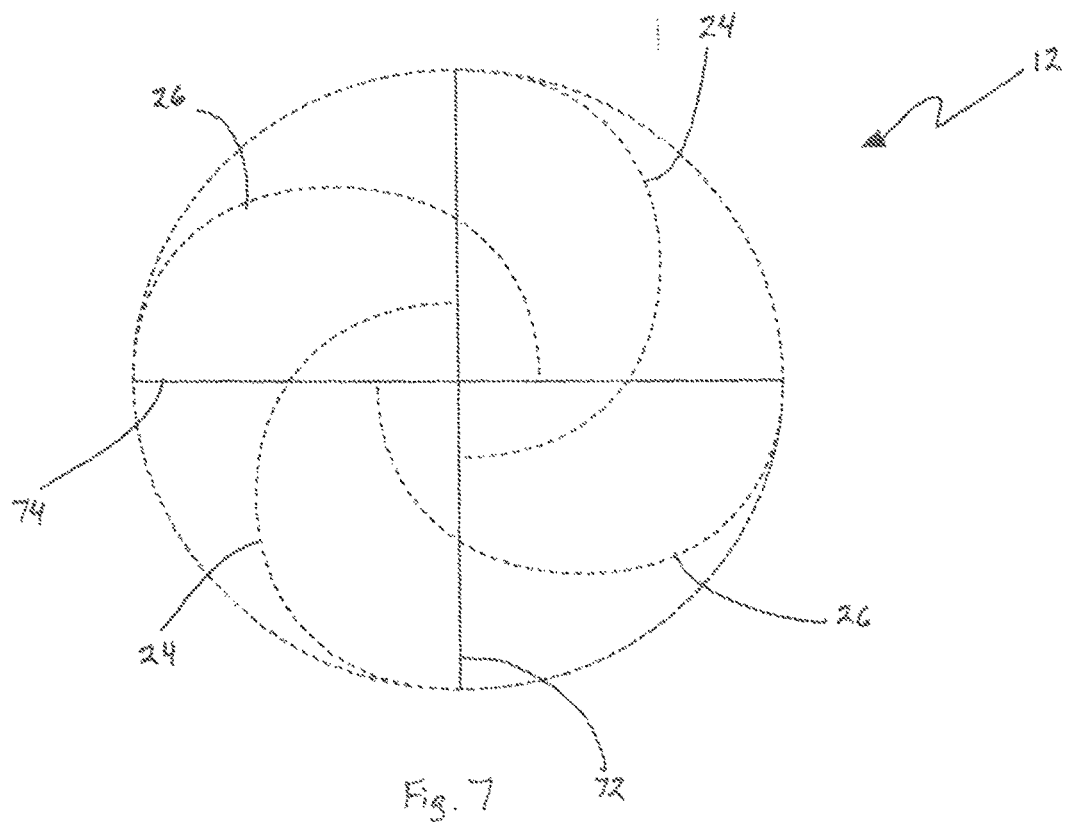
FIG. 7 is a schematic illustration of the rotor assembly of the disclosed self-starting Savonius wind turbine of FIG. 1.
Figure 8:
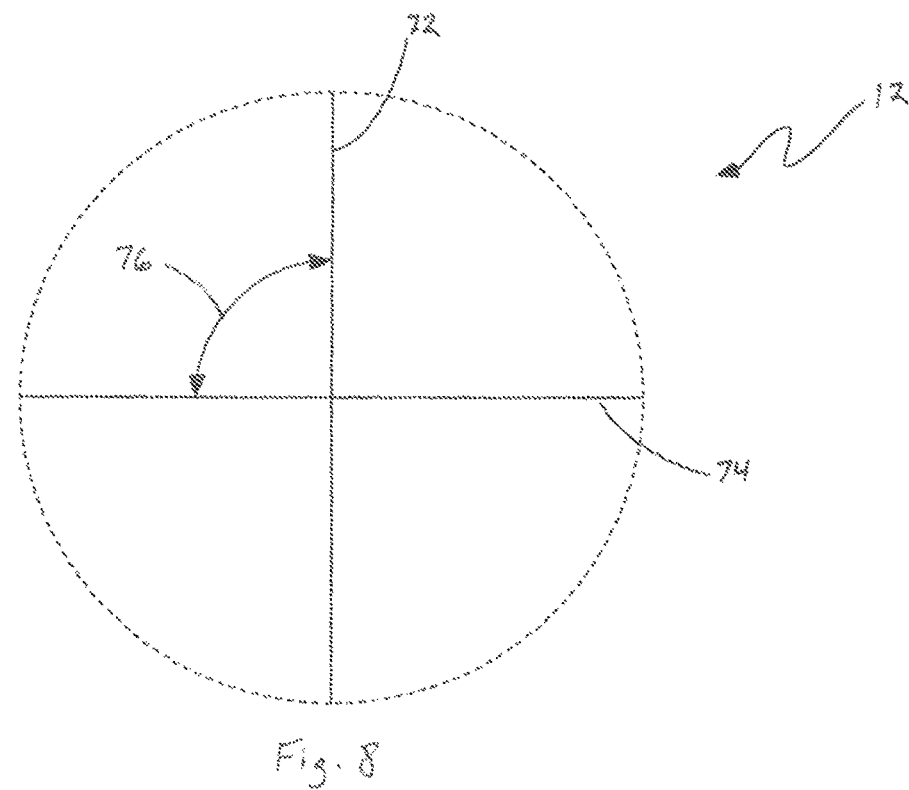
FIG. 8 is another schematic illustration of the rotor assembly of the disclosed self-starting Savonius wind turbine of FIG. 1, illustrating the relative position of the first rotor and the second rotor.

Referring to FIGS. 7 and 8, the line 72 extending between the outer edges 34 of the blades 24 of the first rotor 20 are disposed at a non-zero first angle 76 relative to the line 74 extending between the outer edges 34 of the blades 26 of the second rotor 20. The first angle 76 fixes the blades 24, 26 at a rotated angular position relation to one another. The first angle 76 is sufficiently large to initiate rotation of the rotor assembly 12 upon wind having the sufficiently high velocity to start rotation of the rotor assembly 12 coming from any direction blowing at the wind turbine 10. For example, in one embodiment, the first angle 76 can range between about thirty degrees (30°) and about one hundred thirty-five degrees (135°). In another embodiment, the first angle 76 can range between about forty degrees (45°) and about one hundred twenty degrees (120°). In another embodiment, the first angle 76 can range between about sixty degrees (60°) and about ninety degrees (90°).

Figure 9:
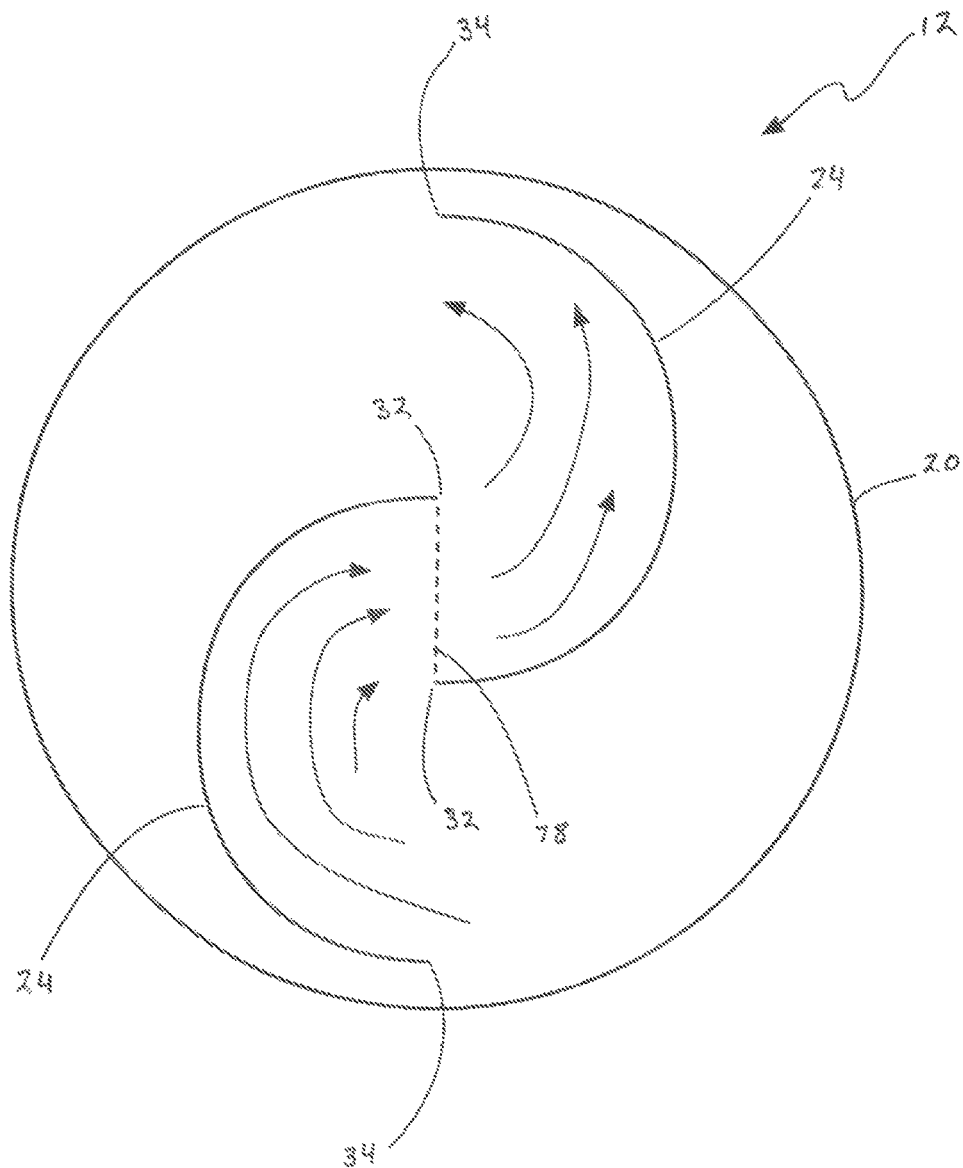
FIG. 9 is a schematic illustration of the first rotor of the disclosed self-starting Savonius wind turbine of FIG. 1.

Referring to FIG. 9, the inner edges 32 of the blades 24 of the first rotor 20 can be spaced apart from one another and the axis of rotation X such that at least a portion of the concave surfaces 36 of the blades 24 face one another. For example, a straight line distance between the inner edges 32 of adjacent blades 24, 26 of the same rotor 20, 22 can range between about two inches and about eighteen inches. As another example, the straight line distance between the inner edges 32 of adjacent blades 24, 26 of the same rotor 20, 22 can range between about four inches and about twelve inches. As another example, the straight line distance between the inner edges 32 of adjacent blades 24, 26 of the same rotor 20, 22 can be about six inches.

A line 78 extending between inner edges 32 of the blades 24 defines a gap 80 between the inner edges 32. The gap 78 is configured to allow and direct a flow of air between concave surfaces 36 of the blades 24. While not shown in FIG. 9, the inner edges 32 of the blades 26 of the second rotor 22 can have substantially the same configuration as the inner edges 32 of the blades 24 of the first rotor 20.

Figure 10:
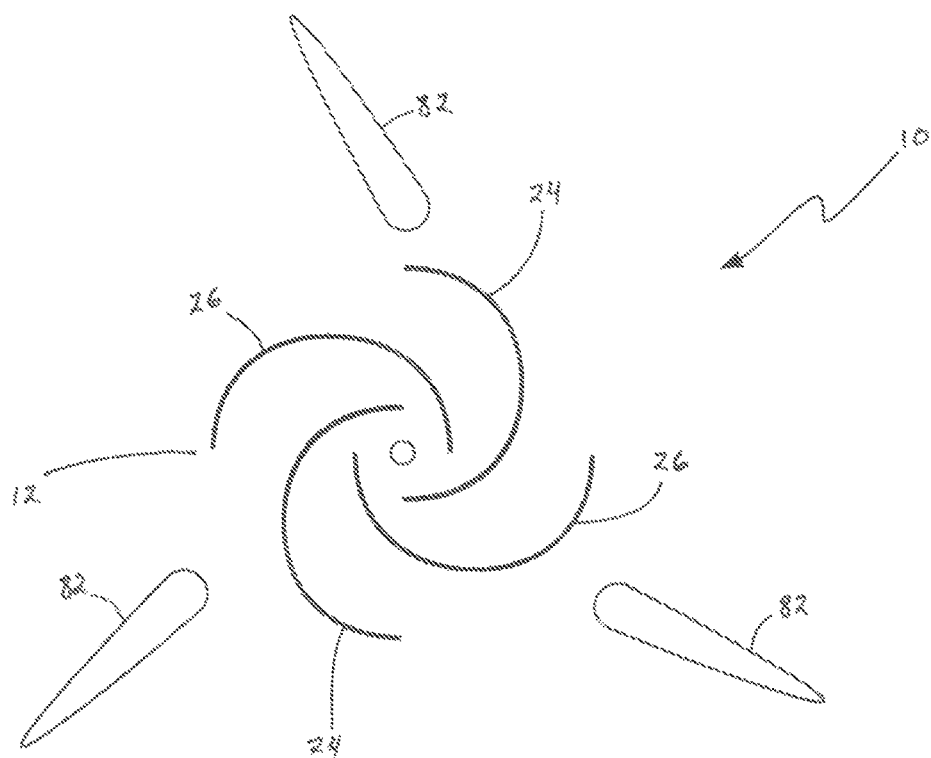
FIG. 10 is a schematic illustration of another embodiment of the disclosed self-starting Savonius wind turbine.

Referring to FIG. 10, the wind turbine 10 can include a plurality of rotatable wind-directing members 82 extending at least partially between the first end 46 and the second end 48 of the frame 14. The wind-directing members 82 are disposed circumferentially around the rotor assembly 12 and positioned proximate the outer edges 34 of the blades 24, 26 of the first rotor 20 and the second rotor 22 upon rotation of the rotor assembly 12. Each of the plurality of wind-directing members 82 has an axis of rotation substantially parallel to the axis of rotation X of the rotor assembly 12. The wind-directing members 82 are configured to direct wind blowing at the wind turbine 10 toward the rotor assembly 12 and a concave surface of an adjacent blade 24, 26.

Each of the wind-directing members 82 can be a single, elongated member or can be a plurality of interconnected sections. The wind-directing members 82 can be planar from edge to edge or can be curved from edge to edge having an airfoil-type design. In one embodiment, the wind-directing members 82 can be rotatably interconnected between corners of the first structure 50 and the second structure 52.

Figure 11:
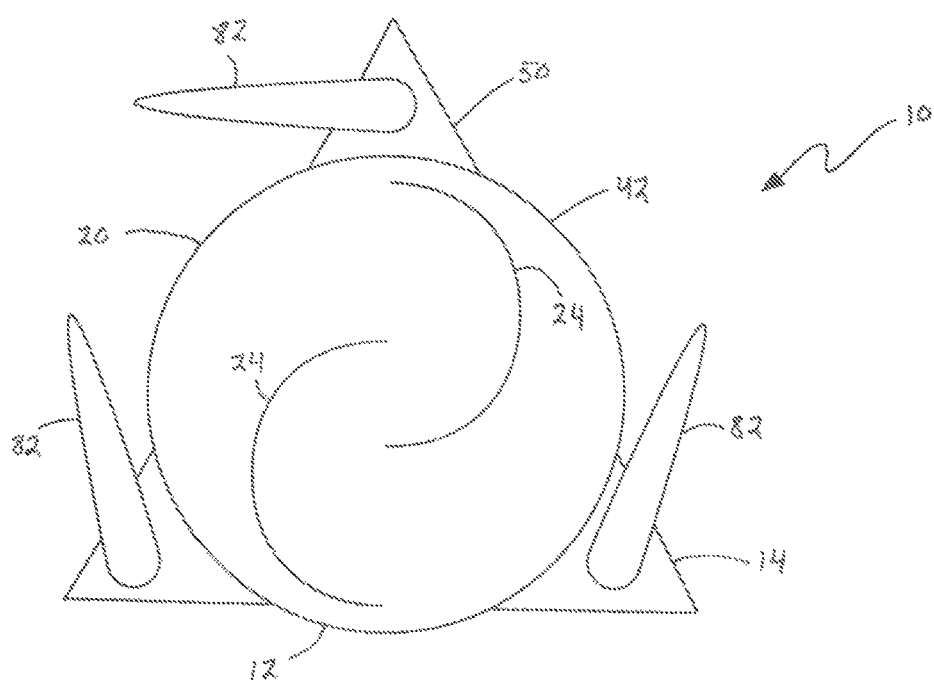
FIG. 11 is a cross-sectional view of the disclosed self-starting Savonius wind turbine of FIG. 10.

Referring to FIG. 11, in another embodiment, the wind-directing members 82 can be integral to the frame members 58 or function as load bearing members between the first structure 50 and the second structure 52. Each wind-directing members 82 is configured to be rotated from a range of about two hundred forty degrees to about three hundred degrees about its axis of rotation.

Referring to FIG. 21, as described above, the wind turbine 10 can be suitably sized to fit, as a single, assembled unit (i.e. including the frame 14 having the rotor assembly 12, the energy utilizing device 16, and the wind-directing members 82) into a standard intermodal shipping container 138, such as an ISO container. During packing of the wind turbine 10 into a shipping container for transporting of the wind turbine 10 or during towing of the wind turbine 10, the wind-directing members 82 can be rotated inwardly to reduce the cross-sectional area of the wind turbine 10. The container 138 housing the wind turbine 10 can be transported by any suitable bulk material shipping vehicle, such as a truck 140, a railcar, or a water vessel.

Figure 12:
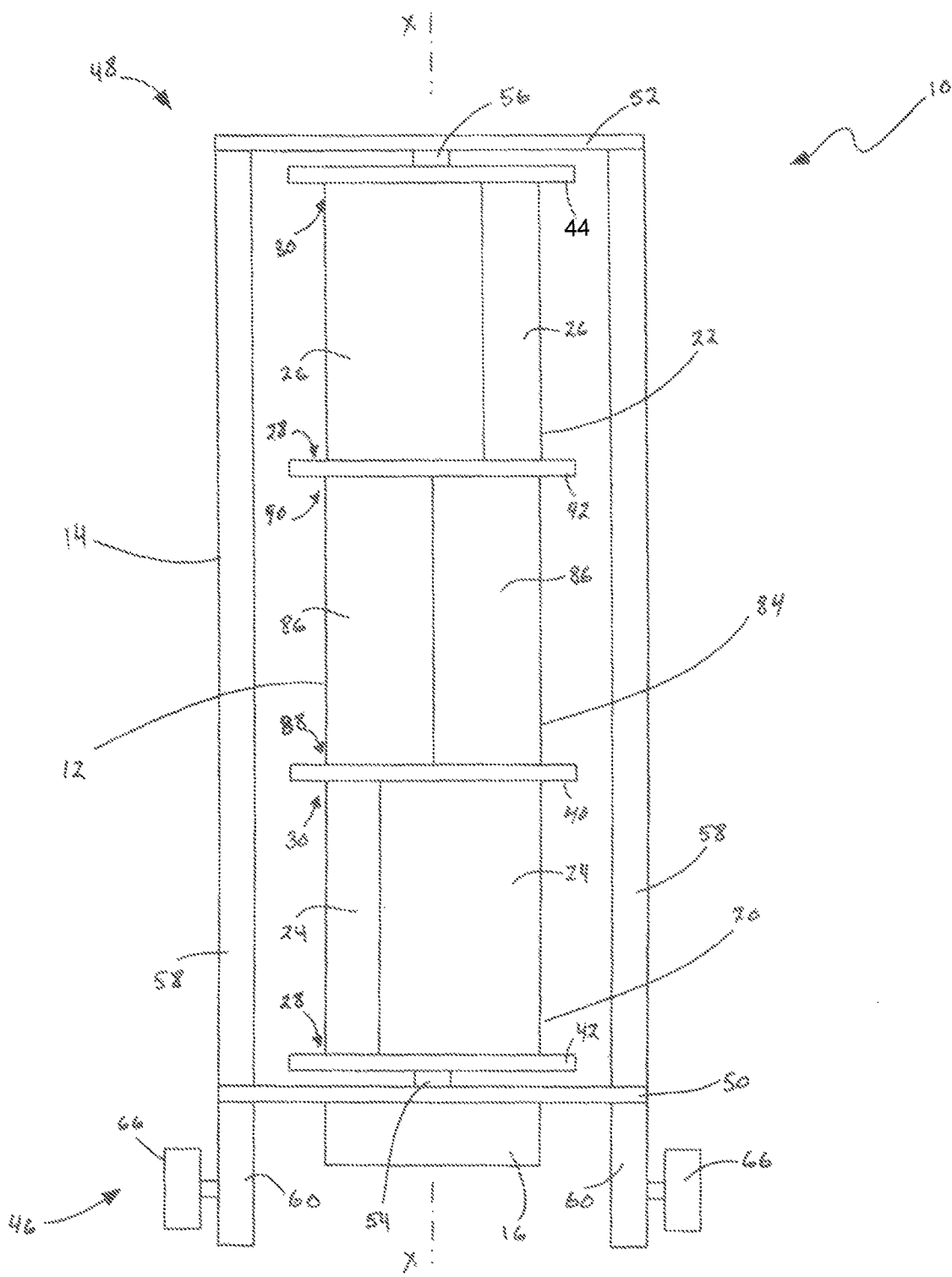
FIG. 12 is a side elevational view of another embodiment of the disclosed self-starting Savonius wind turbine.

Referring to FIG. 12, in another embodiment of the disclosed wind turbine 10, the rotor assembly 12 can include at least one additional rotor 84 being disposed between the first rotor 20 and the second rotor 22. The additional rotor includes at least two substantially identical blades 86. Each blade 86 of the additional rotor 84 includes a first end 88 and an opposed second end 90. At last one additional partition disk 92 is interconnected between the ends of the blades 86 of the additional rotor 84 and ends of blades of an adjacent rotor. For example, as shown in FIG. 12, the partition disk 40 interconnects the first ends 88 of the blades 86 of the additional rotor 84 and the second ends 30 of the blades 24 of the first rotor 20 and the additional partition disk 92 interconnects the second ends 90 of the blades 86 of the additional rotor 84 and the first ends 28 of the blades 26 of the second rotor 22.

Figure 13:
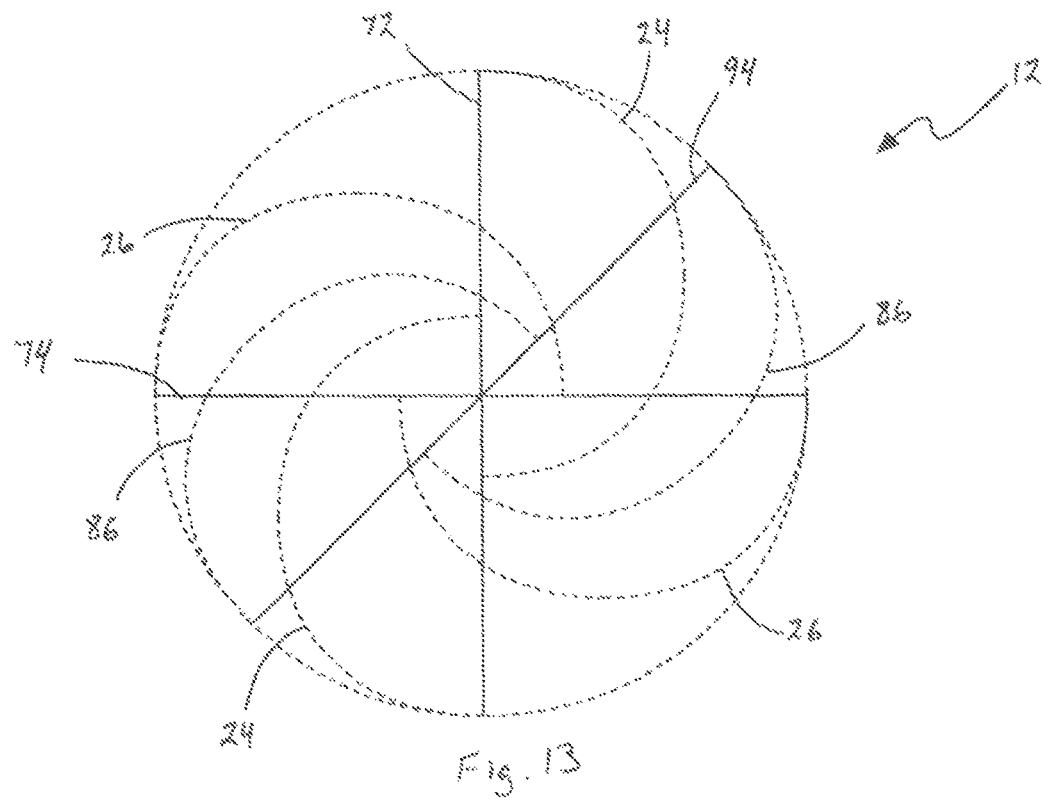
FIG. 13 is a schematic illustration of the rotor assembly of the disclosed self-starting Savonius wind turbine of FIG. 10.

Referring to FIG. 13, each blade 86 of the additional rotor 84 can include substantially similar features as those described for the blades 24, 26 of the first 20 and second 22 rotors. Each of the blades 86 of the additional rotor 84 includes an inner edge relative to the axis of rotation X and an outer edge relative to the axis of rotation X. Each blade 86 is configured to form a curved, partially cylindrical shape having a substantially concave surface and a substantially convex surface extending between the inner edge and the outer edge. The outer edges of each of the blades 86 of the additional rotor 84 are disposed farther away from the axis of rotation X than the inner edges. The rotor assembly 12 can be configured to initiate rotation about the axis of rotation X by at least one blade 24 of the first rotor 20 acting upon the first end disk 42 and the partition disk 40, by at least one blade 26 of the second rotor 22 acting upon the second end disk 44 and the additional partition disk 92, or by at least one blade 86 of the additional rotor 84 acting upon the partition disk 40 and the additional partition disk 92.

As shown in FIG. 13, the outer edges of the blades 86 of the additional rotor 84 lie on a circle defining a diameter of the additional rotor 84. The inner edges and the outer edges of the blades 86 of the additional rotor 84 also lie on a line 94 extending between the outer edges of the blades 86. One or both of the inner edges and the outer edges of the blades 86 of the addition rotor 84 can be substantially parallel to the axis of rotation X. Alternatively, one or both of the inner edges and the outer edges of the blades 86 of the additional rotor 84 can be at an angle relative to the axis of rotation X. In one embodiment, the diameter of the first rotor 20, the diameter of the second rotor 22, and the diameter of the additional rotor 84 are substantially the same. In another embodiment, the diameter of the first rotor 20, the diameter of the second rotor 22, and the diameter of the additional rotor 84 are substantially different. The diameters of the additional rotor 84 can vary to provide the concave surface of each blade 86 a suitable surface area sufficient to rotate the rotor assembly 12 upon wind having a sufficient velocity blowing on the concave surface In one embodiment of the wind turbine, the diameter of the additional rotor 84 can be substantially less than a diameter of each of the partition disks 40, 92. A straight line distance between the partition disks 40, 92 can be larger than the diameter of the additional rotor 84. A straight line distance between the partition disks 40, 92 can be larger than the diameter of the additional rotor 84. The straight line distance between the first end disk 42 and the partition disk 40 and the straight line distance between the partition disks 40, 92, and the straight line distance between the additional partition disk 92 and the second end disk 44 can be substantially the same or can be substantially different.

Figure 14:
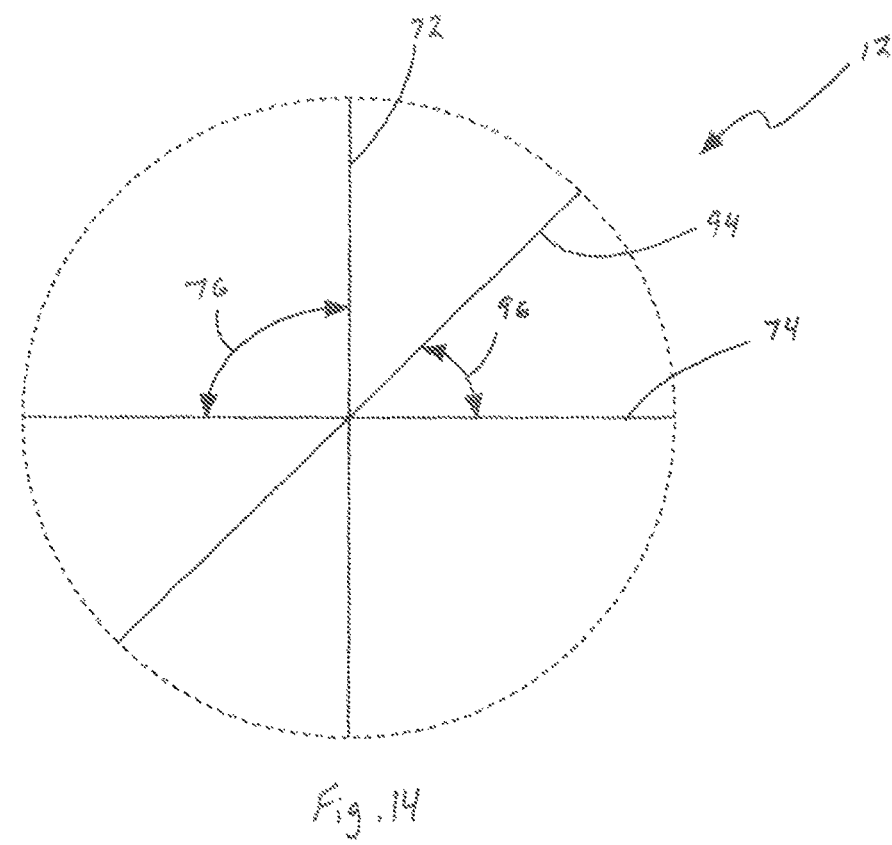
FIG. 14 is a schematic illustration of the rotor assembly of the disclosed self-starting Savonius wind turbine of FIG. 10, illustrating the relative position of the first rotor, the second rotor, and the additional rotor.

Referring to FIG. 14, the line 94 extending between the outer edges of the blades 86 of the additional rotor 84 are disposed at a non-zero second angle 96 relative to the line 72 extending between the outer edges 34 of the blades 24 of the first rotor 20. The first 76 and second 96 angles fix the blades 24, 26, 86 at a rotated angular position relation to one another. The second angle 96 is sufficiently large to initiate rotation of the rotor assembly 12 upon wind having the sufficiently high velocity to start rotation of the rotor assembly 12 coming from any direction blowing at the wind turbine 10. The inner edges of the blades 86 of the additional rotor 84 can be spaced apart from one another and the axis of rotation X such that at least a portion of the concave surfaces of the blades 86 face one another. A line extending between inner edges of the blades 86 defines a gap between the inner edges configured to allow and direct a flow of air between concave surfaces of the blades 86.

Figure 15:
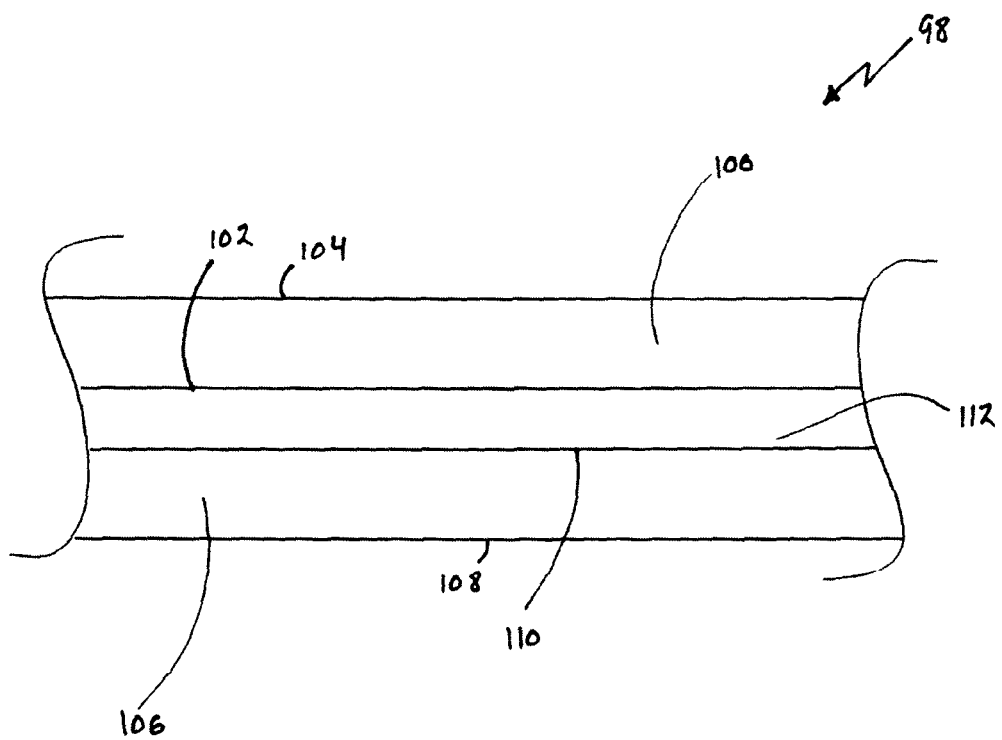
FIG. 15 is a partial cross-sectional view of the composite laminate of the disclosed self-starting Savonius wind turbine.

Referring to FIG. 15, in at least one embodiment of the disclosed wind turbine 10, the structural elements of the rotor assembly 12 can be formed from or made of a composite laminate 98. For example any of the blades 24, 26, 86, the end disks 42, 44, or the partition disks 40, 92 can be made of the composite laminate 98. The composite laminate 98 includes at least a first sheet 100 having a first face 102 and a second face 104, a second sheet 106 having a first face 108 and a second face 110, and a third sheet 112 disposed between the first face 102 of the first sheet 100 and the first face 108 of the second sheet 106.

Each first 100 and the second 106 sheet can be an organic material. In one implementation, the organic material can include hardwood, such as angouma wood, gaboon wood, okoumé wood, oak wood, maple wood, and the like. For example, *Aucoumea klaineana* (e.g., angouma wood, gaboon wood, or okoume wood) having a marine grade can be used as the primary laminate layers (i.e., the first 100 and second 106 sheets). Okoume is a tree in the family Burseraceae native to equatorial West Africa and is considered one of the finest construction plywoods for boat building. The first 100 and second 106 sheets can be a BS 1088 material. BS 1088 is a material specification for marine plywood produced with untreated tropical hardwood veneers with a set level of resistance to fungal attack and bonded with a glue highly resistant to weather, microorganisms, cold and boiling water, steam and dry heat.

As another implementation, the organic material can include bamboo. For example, the rotor assembly 12 can use bamboo or bamboo in addition to hardwood. Bamboo is heartier than oak and stronger than steel, yet grows like a grass. It is flexible and lightweight, but stronger than most hardwoods. Bamboo's strength is comparable to maple wood, one of the strongest hardwoods available. Though bamboo is naturally water-resistant, its treatment process further increases its water resistance, making the end product less likely to warp. Because it is so sustainable and easy to grow, bamboo can be more affordable than most other types of woods. It can be easily grown and harvested, so it is an inexpensive construction material.

As another implementation, the first 100 and second 106 sheets can be made of any suitably durable renewable material.

The third sheet can be synthetic fiber material. In one implementation, the synthetic fiber material can be woven into a sheet of para-aramid synthetic fiber fabric, such as fibrous poly-paraphenylene terephthalamide material, commercially known as Kevlar®. For example, the synthetic fiber third sheet 112 can be a Kevlar® twill pattern sheet by DuPont®.

The third sheet 112 is in contact with at least a substantial area of the first face 102 of the first sheet 100 and the first face 108 of the second sheet 106. The first sheet 100, the second sheet 106, and the third sheet 112 are adhered together. The first sheet 100, the second sheet 106, and the third sheet 112 can be adhered together with any suitable chemical bonding material, such as glue, epoxy, or resin.

During manufacture, the composite laminate 98 can be formed into a final shape through any suitable process or method, for example by a cold molding process. In an example method for forming the composite laminate 98, the first 100 and second 106 sheets are cut or otherwise formed into a shape, for example a circular shape for the disks, 40, 42, 44, 92 and a rectangular shape for the blades 24, 26, 86. An epoxy resin is applied to substantially all of the first face 102 of the first sheet 100. Substantially all, or at least a portion of, the first face 102 of the first sheet 100 is overlaid with the third sheet 112. Any air pockets between the first sheet 100 and the third sheet 112 can be removed. The epoxy resin is applied to substantially all of the first face 108 of the second sheet 106. The first face 102 of the first sheet 100 is overlaid with the first face 108 of the second sheet 106 with the third sheet 112 between the first sheet 100 and the second sheet 106. Any remaining air pockets between the first sheet 100, the third sheet 112, and the second sheet 106 can be removed. The composite laminate 98 can then be compressed and cured under pressure, such as by clamps and straps. The composite laminate 98 forming the blades 24, 26, 86 can be formed over a curved partially cylindrical-shaped mold, such as a cylindrical steel tube. As needed, warm or cool air can be directed onto the mold, for example through the steel tube, to maintain a suitable curing temperature for the epoxy resin.

Figure 18:
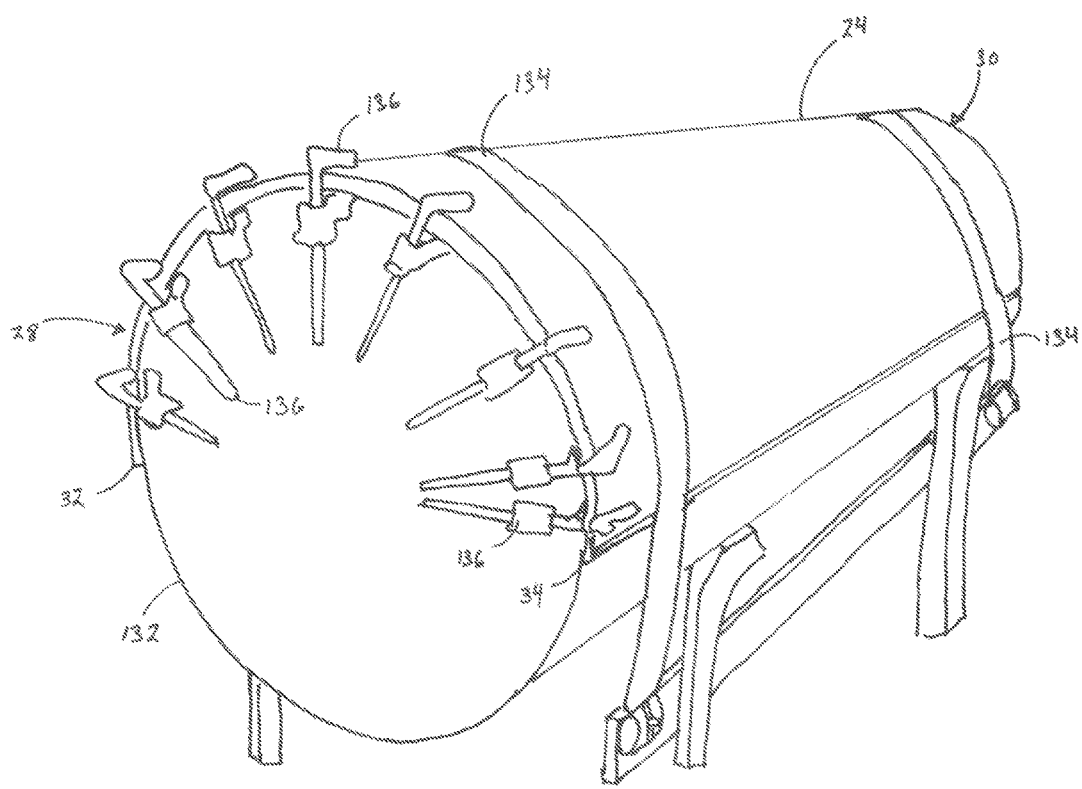
FIG. 18 is a side perspective view of a blade forming mold of the disclosed self-starting Savonius wind turbine, illustrating molding of the blade.

Referring to FIG. 18, the composite laminate 98 of forming the blades 24, 26, 86 can be placed on a cold mold 132 while the epoxy is uncured. The composite laminate 98 can be laid upon the mold 132 and bend across, or over, the mold 132, for example a cylindrical steel tube supported by a support frame, and compressed into the curved partially cylindrical shape around the radius of the mold 132. The composite laminate 98 can be secured around the mold 132 by any suitable mechanisms. For example, the composite laminate 98 can be secured around the mold 132 with high-strength ratchet straps 134 extending from the inner edge 32 to the outer edge 34 of the blade 24, 26, 86. The composite laminate 98 can be secured to the mold 132 by wood clamps 136 clamped to both the first end 28 and the second end 30 of the blade 24, 26, 86.

The mold 132 can be a steel finished and polished smooth with epoxy. A mold release agent can be applied prior to setting the composite laminate 98 in place. Additionally, sheet aluminum strips can be set on the mold 132 at both ends of the mold 132 under the composite laminate 98 so any epoxy squeezed out during compression does not contact the cured epoxy on the mold 132. The aluminum strips can be discarded when the blade 24, 26, 86 has cured and is removed from the mold 132.

In one example implementation, the laminating process can utilize a medium epoxy resin designed for fabricating parts and other structural applications. The epoxy can be a copolymer that is formed from two different chemicals, for example, a resin and a hardener. The resin and hardener can be mixed per manufacturer's specifications. When the resin and the hardener are mixed, amine groups react with epoxide groups to form a covalent bond. Each group can react with an epoxide group from distinct prepolymer molecules, so that the resulting polymer is heavily cross-linked to provide a rigid and strong bond between surfaces. A two-part resin epoxy glue can be used to maximize the physical properties of the synthetic fiber third sheet 112 (e.g., Kevlar®) and the organic material first 100 and second 106 sheets (e.g., wood or bamboo) of the composite laminate 98. The low viscosity and handling characteristics of two-part epoxy adhesives can provide superior bonding characteristics over other room temperature epoxies, vinyl ester, and isophthalic polyester resin.

For example, the composite laminate 98 of the rotor blades 24, 26, 86 can include epoxy resin mixed with a sixty-minute pot life hardener. The one-hour working time accommodates for the time required to prepare the laminate layer first 100 and second 106 sheets, place the third sheet 112 between the first 100 and second 106 sheets, and position the composite laminate 98 of the onto the mold to form the curved blades 24, 26, 86. The long curing time allows the epoxy to absorb more fully into the synthetic fiber third sheet 112 (e.g., a woven fabric) and natural pores of the first 100 and second 106 sheets (e.g., wood or bamboo), thus making a very strong composite laminate 98 upon curing.

The composite laminate 98 of the disks 40, 42, 44, 92 can include epoxy resin mixed with a twenty-minute pot life hardener. Since the disks 40, 42, 44, 92 do not require bending, the additional time is not required.

The composite laminate 98 can be maintained at a relatively constant temperature during the mixing and curing of the epoxy resin. For example, the temperature can be at least about seventy degrees Fahrenheit (70° F.). The cure time can be cut in half for about every ten degrees Fahrenheit (10° F.) that the temperature is raised above 70° Fahrenheit. Since curing epoxy produces heat, the post cured temperature of the composite laminate 98 can be approximately two hundred degrees Fahrenheit (200° F.). The surface temperature of the curing composite laminate 98 can be monitored, for example by using a non-contact infrared digital thermometer. Heating or cooling can be applied to the mold 132 to maintain the composite laminate 98 at an optimum curing temperature, for example between about one hundred eighty and about two hundred twenty degrees Fahrenheit (180°-220° F.) for approximately thirty (30) minutes beyond the pot life time. Heating or cooling can be applied by directing hot or cold air through the tubular steel pipe as needed to maintain the temperature. Heat can radiate through the mold and can be transferred between the mold 132 and the composite laminate 98. The composite laminate 98 can then be left in the mold under pressure for between about twenty-four and forty-eight hours at room temperature.

During the curing process, the relative humidity can be maintained between about thirty and about sixty percent (30 and 60%). The relative humidity can influence the overall time, under pressure in the mold before release, and can have a slight effect on the moisture content of the composite laminate 98. However, relative humidity does not effect the curing time of the epoxy. A lower relative humidity can allow for a quicker mold release than a higher relative humidity.

A water mist can be applied to cool the blade 24, 26, 86 once they are removed from the mold 132. Light ratchet straps and right angle steel can be used to maintain the shape of the blade 24, 26, 86 until curing is completed approximately twenty-four to forty-eight hours later. The cured and dried blades 24, 26, 86 and the disks 40, 42, 44, 92 can result in a light and very strong laminate in the desired shape for the rotor assembly 12.

Figure 19:
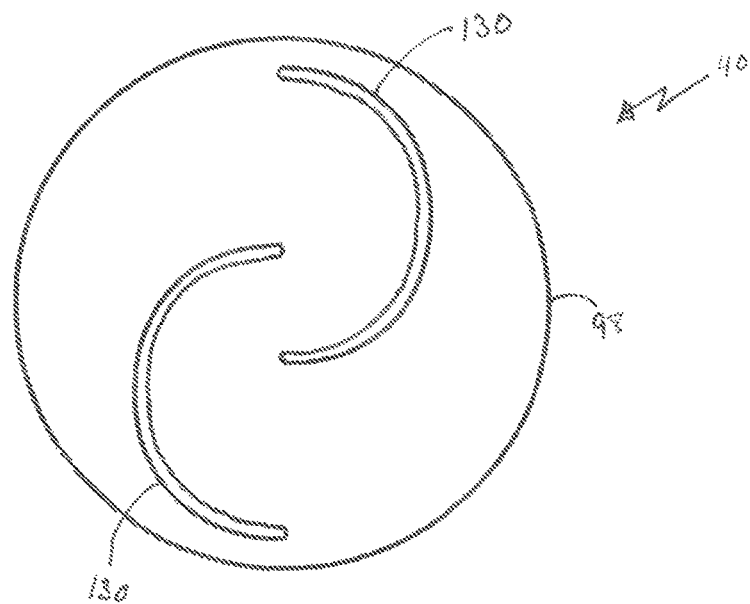
FIG. 19 is top plan view of an embodiment of the end disk of the disclosed self-starting Savonius wind turbine.
Figure 20:
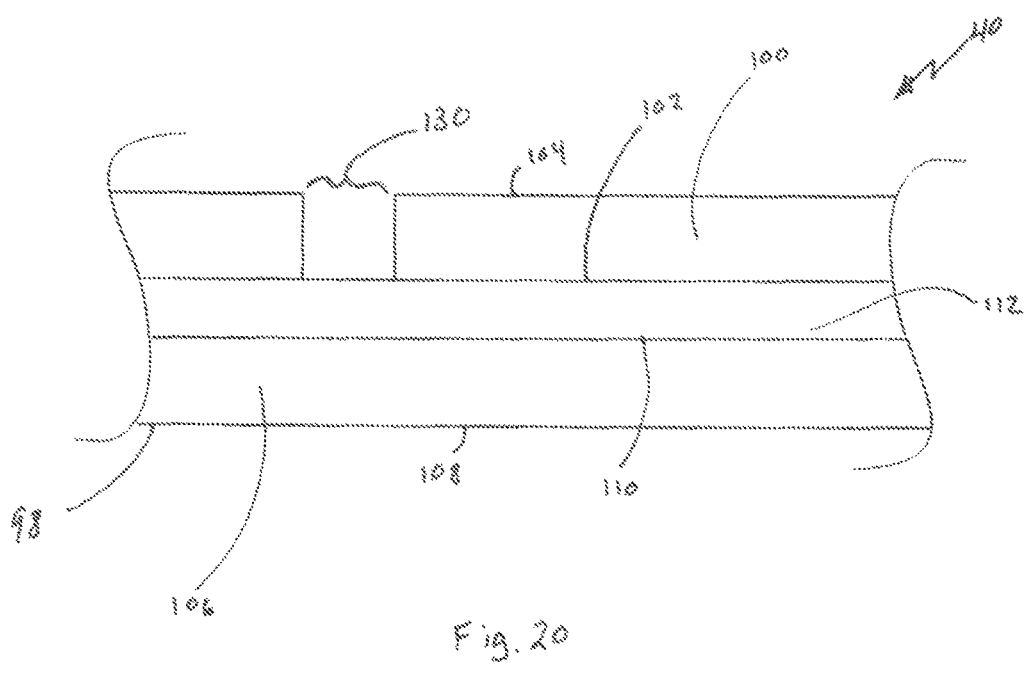
FIG. 20 is a partial cross-sectional view of the composite laminate of the end disk of FIG. 19.

Referring to FIGS. 19 and 20, at least two recesses 130 can be cut, routed, machined, or otherwise formed into at least one second face 104, 110 of the first 100 or second 106 sheet of the composite laminate 98 of the disks 40, 42, 44, 92 for receiving an associated end 28, 30 of the blade 24, 26, 86. For example, the recesses 130 can be curved partially cylindrical grooves matching the shape of the ends 28, 30 of the blades 24, 26, 86. In one embodiment, the recesses 130 can extend through the first sheet 100 from the second face 104 to the third sheet 112 (e.g., the first end disk 42 and second end disk 44), or extend through the first sheet 100 from the second face 104 to the third sheet 112 and through the second sheet 106 from the second face 110 to the third sheet 112 (e.g., the partition disk 40, 92).

The ends 28, 30 of the blades 24, 26, 86 can be adhered to a corresponding disk 40, 42, 44, 92 to form the assembled rotor assembly 12 having the desired number of rotors 20, 22, 84. The blades 24, 26, 86 can be attached to the disks 40, 42, 44, 92 by an epoxy resin mixed with a twenty-minute pot life hardener.

Optionally, the entire rotor assembly 12 can be applied with a marine grade varnish, an ultraviolet light-resistant material, paint, or other water-proofing finish to protect the rotor assembly 12 from weather and water. The epoxy resin used with the composite laminate 98 and to attach the blades 24, 26, 86 and the disks 40, 42, 44, 92 can deteriorate under ultraviolet light without a top coat.

Figure 16:
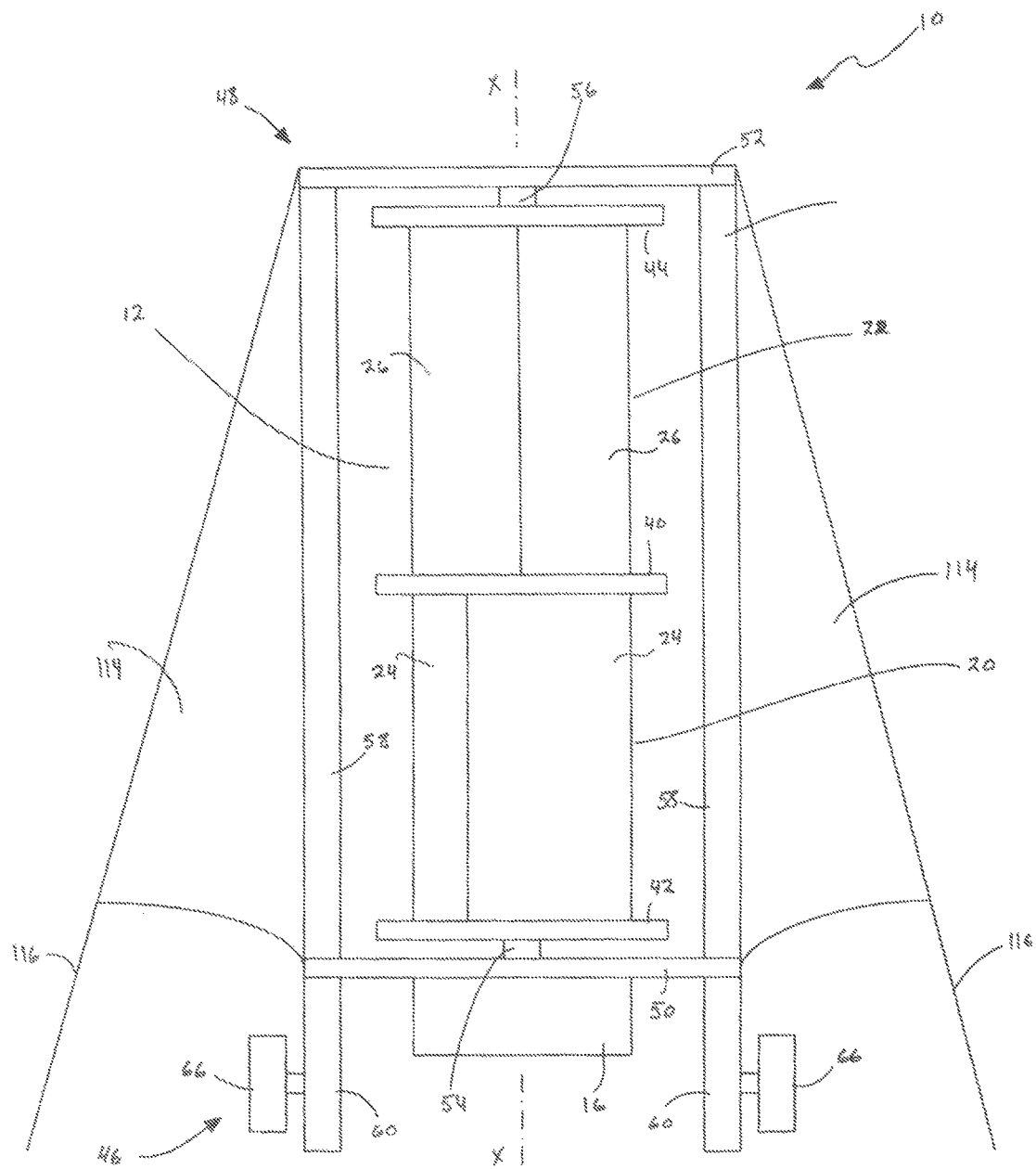
FIG. 16 is a side elevational view of another embodiment of the disclosed self-starting Savonius wind turbine.

Referring to FIG. 16, another embodiment of the wind turbine 10 can include a plurality of flexible sails 114 extending at least partially between the first end 46 and the second end 48 of the frame 14. The plurality of sails 114 are disposed circumferentially around the rotor assembly 12 and are configured to increase a wind-swept area around the wind turbine 10 and direct wind at the rotor assembly 12. The sails 114 can have any suitable configuration and be made from any suitably durable material or fabric.

As illustrated, in an example embodiment, each of the sails 114 can include a lower end, or foot, connected at an inner edge, proximate the frame 14, to the first structure 50 and an upper end, or head, connected to the second structure 52. The upper end of each sail 114 can, for example, be connected to the fasteners 70. The guy wire 116 can extend from the second structure 52 to the support surface (e.g., a ground surface) through an outer edge, spaced away from the frame 14, of the sail 114.

In addition to collecting wind and directing wind blown at the rotor assembly 12, the sails 114 are configured to increase the velocity of the wind traversing a back side of the sail 114, due to the wind having to move over a greater distance than the wind traversing a front side of the sail 114 and creating a low pressure system.

Figure 17:
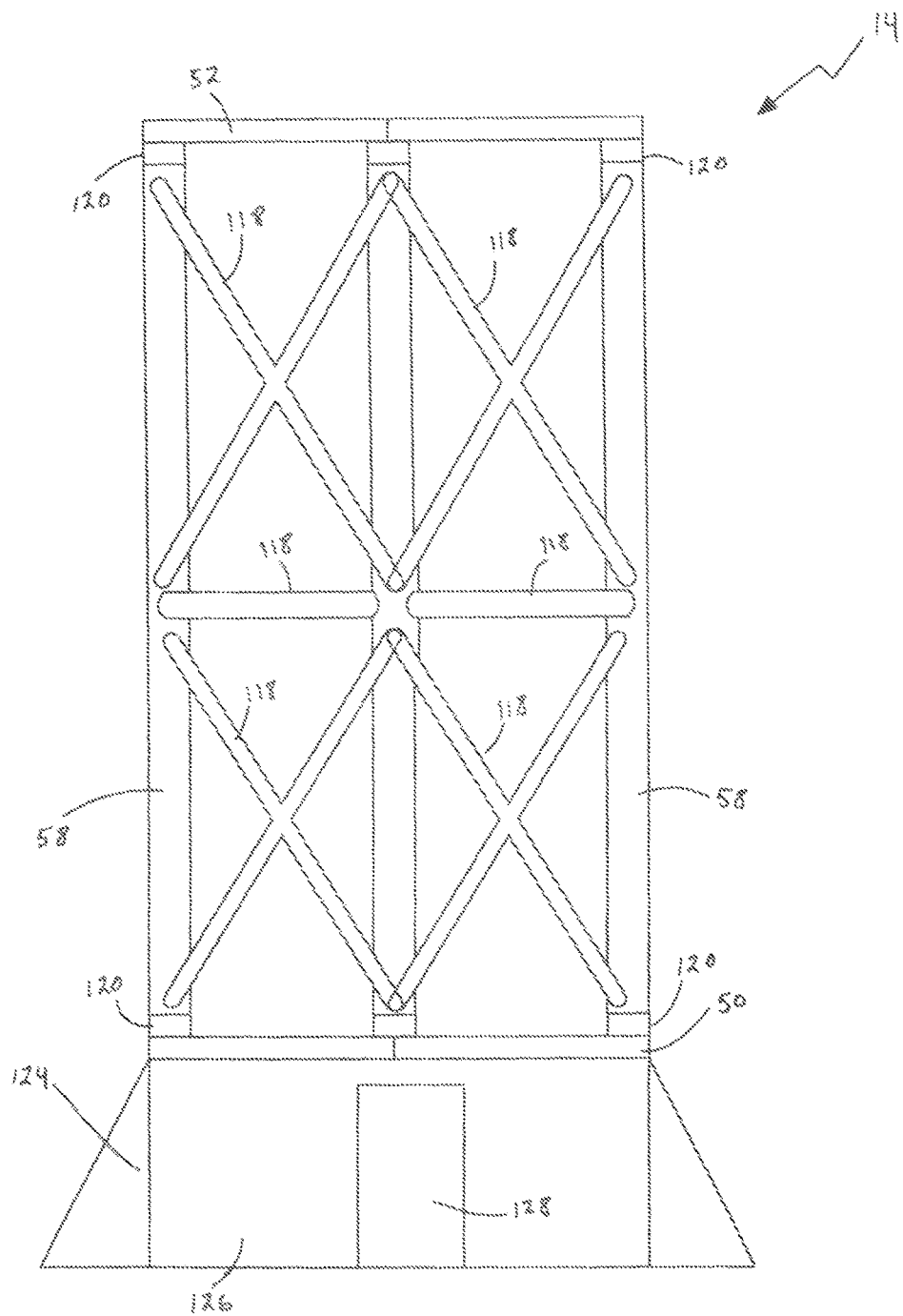
FIG. 17 is a side elevational view of an embodiment of the frame of the disclosed self-starting Savonius wind turbine.

Referring to FIG. 17, in another embodiment of the wind turbine 10, the frame 14 can include a plurality of cross-braces 118 extending between and interconnecting the frame members 58. The cross-braces 118 can be connected to the frame members 58 in any configuration suitable to provide additional load-bearing support to the frame 14.

Figure 22:
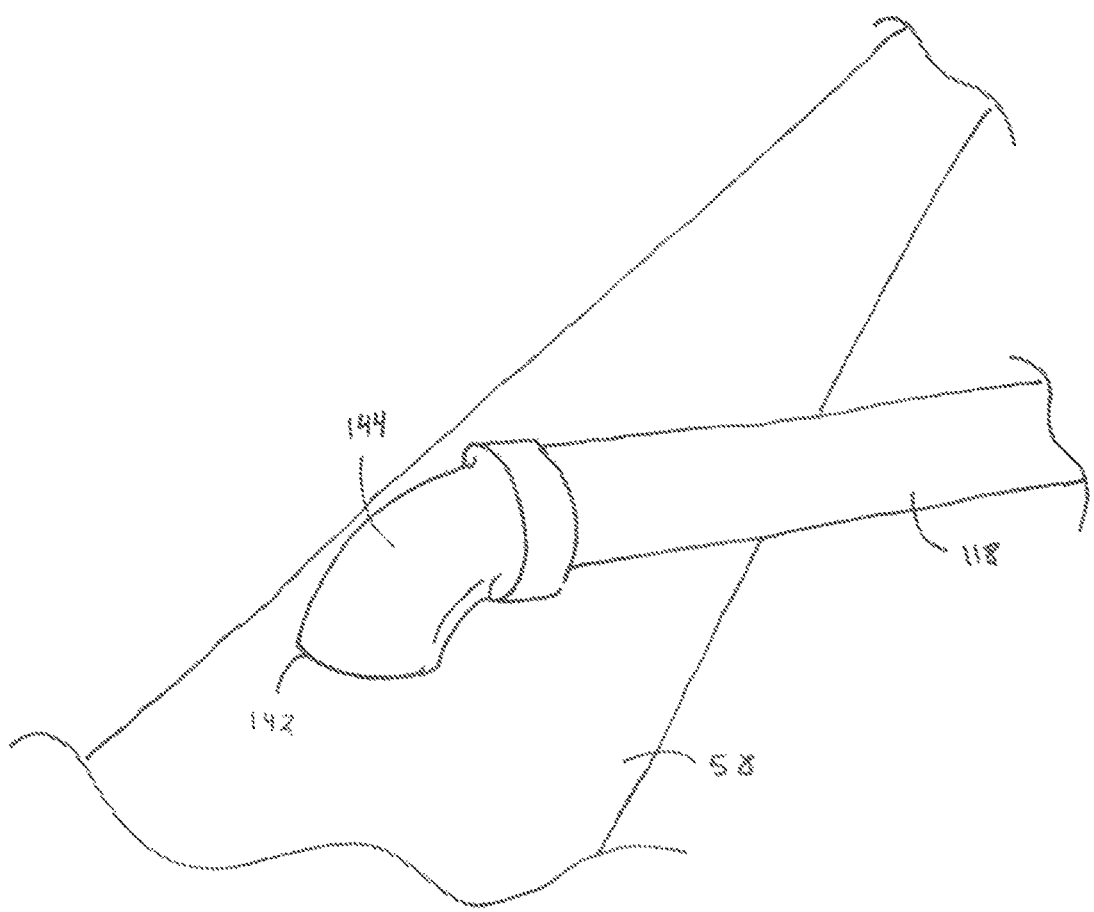
FIG. 22 is a partial close-up side perspective view of a frame member of the disclosed self-starting Savonius wind turbine.

Referring to FIG. 22, the frame members 58 can have any cross-sectional shape, such as circular, square, rectangular, triangular, or the like. Similarly, the cross-braces 118 can have any cross-sectional shape. In one embodiment, the frame member 58 can have a plurality of cross-brace apertures 142 for receiving connected ends of each cross-brace 118. For example, as illustrated in FIG. 22, the frame members 58 can be elongated plastic tubular members and the cross-braces 118 can be plastic tubular members having a cross-sectional diameter less than the cross-sectional diameter of the frame members 58. A brace connector 144 can be affixed to each opposing end of the cross-brace 118 and insertably attached to the frame member 58 within the cross-brace aperture 142. The cross-braces 118 can be affixed to the frame members 58 by mechanical fasteners, adhesives, or by a friction fit between the brace connectors 144.

Figure 23:
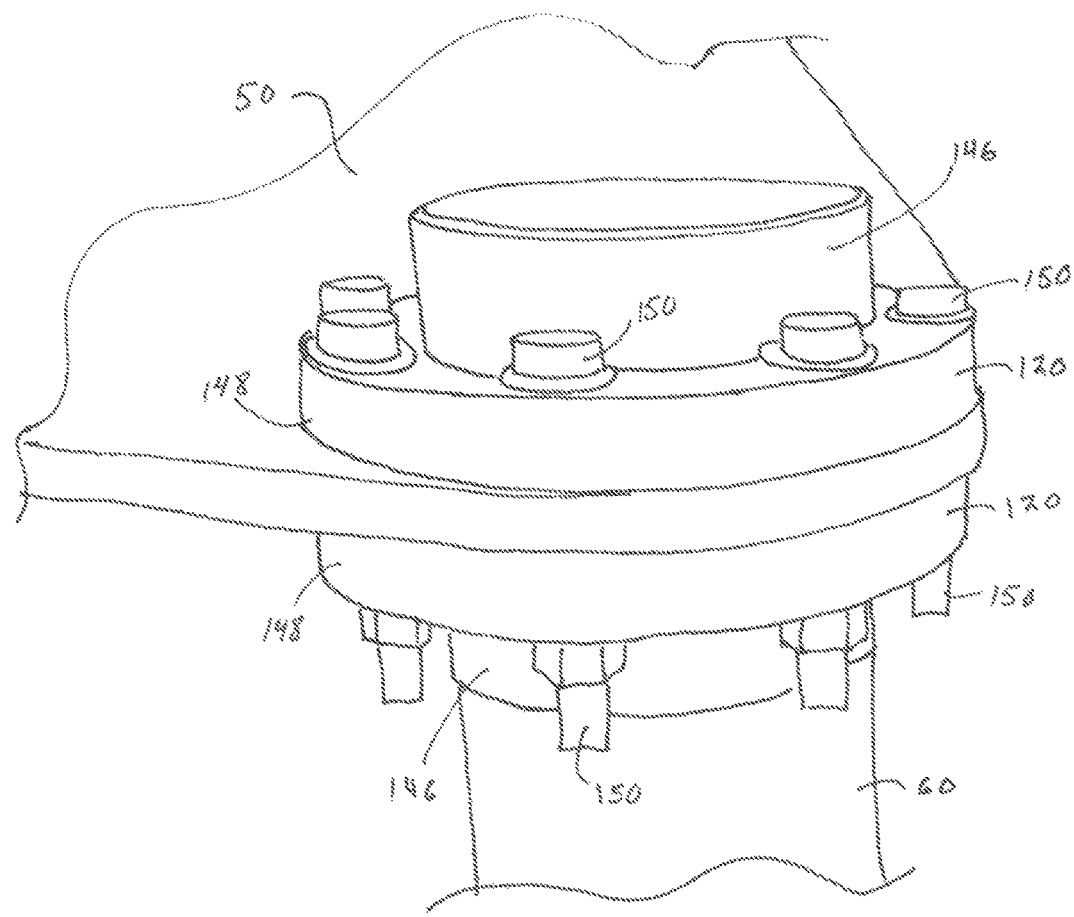
FIG. 23 is side perspective view of a structural connector of the disclosed self-starting Savonius wind turbine.

Referring to FIG. 23, the ends of the frame members 58 can be connected to the first 50 and second structure 52 by any suitable structural connector 120, such as a flanged connector or the like. For example, the structural connector 120 can be a flanged pipe coupling having a central, walled receiver 146 and a perimeter flange 148. Ends of the frame members 58, or the supports 60, can be insertably connected within the receiver 146 to connect to the first 50 and second 52 structures of the frame 14. The frame members 58 can be attached to the structure connector 120 by mechanical fasteners, adhesives, or by a friction fit between the receiver 146. The flange 148 of the structural connector 120 can be attached to the first 50 and second 52 structures by fasteners 150.

Each of the components of the frame 14 can be attached to one another with any suitably strong and durable mechanical fastening hardware or by adhesives. The frame 14 is made entirely of non-ferrous, non-corrosive materials, including the first 50 and second 52 structures, the frame members 58, the supports 60, the cross-braces 118, the structural connectors 120, and the fasteners 150. For example, all of the structural components of the frame 14 can be made of any suitably rigid, durable and lightweight material, such as a solid polyvinyl chloride (PVC) and the connections (e.g., the structural connectors 120 and first 50 and second 52 structures) can be bolted together with fasteners 150, such as ¾" nylon bolts. The frame 14 is designed to be very strong, but weigh under five hundred pounds.

Referring again to FIG. 17, the wind turbine 10 can also include a protective skirt 124 configured to enclose the first end 46 of the frame 14. For example, the skirt 124 can include a plurality of sidewalls 126, for example having hexagonal shape when assembled. The skirt 124 can be made from any suitably durable material, including heavy fabric, metal, or plastic. The skirt 124 can be folded for transportation with the wind turbine 10.

For example, in the illustrated embodiment, the skirt 124 includes a plurality of rigid side walls 126 to enclose the first end 46 of the frame 14 from the first structure 50 to the support surface and protect the energy utilizing device 16 and any associated components. The skirt 124 can include an access 128, such as a door, disposed in at least one of the sidewalls 126. The sidewalls may be hingedly connected along adjacently aligned edges such that the sidewalls 126 are foldable upon themselves.

Because wind density, wind speed, and other environmental conditions are highly variable, the rotor assembly 12 can be designed to balance total cost of ownership with performance measured in terms of efficiency in capturing wind energy. The materials and manufacturing process of the rotor assembly 12 and the frame 14 are a compromise between weight, strength, durability, cost, and environmental sustainability as measured by the overall carbon footprint of the wind turbine 10.

When used in conjunction with an electrical generator as the energy utilizing device 16, an embodiment of the wind turbine 10, having a distance of about twenty feet between the frame first end 46 and the frame second end 48, can produce an annual average kilowatt hour (kWh) of between about 4,000 kWh and about 30,000 kWh in wind conditions having a velocity ranging from about four miles per hour (mph) to about 10 mph, and about 39,000 kWh in wind conditions having a velocity over 10 mph. An embodiment of the wind turbine 10, having a distance of about forty feet between the frame first end 46 and the frame second end 48, can produce an annual average kilowatt hour (kWh) of between about 10,000 kWh and about 66,000 kWh in wind conditions having a velocity ranging from about four mph to about 10 mph, and about 95,000 kWh in wind conditions having a velocity over 10 mph. An embodiment of the wind turbine 10, having a distance of about fifty feet between the frame first end 46 and the frame second end 48, can produce an annual average kilowatt hour (kWh) of between about 160,000 kWh and about 92,000 kWh in wind conditions having a velocity ranging from about four mph to about 10 mph, and about 131,000 kWh in wind conditions having a velocity over 10 mph.

The components disclosed in the patents, patent applications, patent publications, and other documents disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications, patent publications, and other documents cited herein, and in the Declaration attached hereto, are hereby incorporated by reference as if set forth in their entirety herein except for the exceptions indicated herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, patent applications, patent publications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, patent applications, patent publications, and other documents either incorporated by reference or not incorporated by reference.

U.S. Provisional Patent Application No. 61/638,793, filed on Apr. 26, 2012, having inventor Ronald GDOVIC, is hereby incorporated by reference as if set forth in its entirety herein, except for the exceptions indicated herein.

All of the references and documents cited in any of the patents, patent applications, patent publications, and other documents cited herein, except for the exceptions indicated herein, are hereby incorporated by reference as if set forth in their entirety herein except for the exceptions indicated herein. All of the patents, patent applications, patent publications, and other documents cited herein, referred to in the immediately preceding sentence, include all of the patents, patent applications, patent publications, and other documents cited anywhere in the present application.

Words relating to the opinions and judgments of the author of all patents, patent applications, patent publications, and other documents cited herein and not directly relating to the technical details of the description of the embodiments therein are not incorporated by reference.

The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned words in this sentence, when not used to describe technical features of one or more embodiments of the patents, patent applications, patent publications, and other documents, are not considered to be incorporated by reference herein for any of the patents, patent applications, patent publications, and other documents cited herein.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications, patent publications, and other documents cited herein may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A Savonius wind turbine comprising:
   a self-starting rotor assembly rotatably having an axis of rotation, said rotor assembly comprising:
   a first rotor comprising two blades, each blade of said first rotor comprising a first end, a second end opposite said first end, an inner edge, and an outer edge, each of said blades of said first rotor forming a curved partially cylindrical shape between said inner edge and said outer edge;

a second rotor comprising two blades, each blade of said second rotor comprising a first end, a second end opposite said first end, an inner edge, and an outer edge, each of said blades of said second rotor forming a curved partially cylindrical shape between said inner edge and said outer edge;

a rigid partition disk interconnected between said second ends of said blades of said first rotor and said first ends of said blades of said second rotor;

a rigid first end disk connected to said first ends of said blades of said first rotor;

a rigid second end disk connected to said second ends of said blades of said second rotor;

a transportable frame configured to rotatably support said rotor assembly, said frame comprising a first end and a second end; and a transmission operably connected to said rotor assembly;

said first end disk being rotatably connected to said first end of said frame;

said second end disk being rotatably connected to said second end of said frame;

said outer edges of each of the blades of the first rotor being disposed farther away from said axis of rotation than said inner edges and wherein said axis of rotation is positioned between the outer edges and the inner edges of the inner surfaces of each blade so that an air passage is defined between the blades;

said inner edges of the blades of said first rotor being spaced apart;

said outer edges of each of the blades of the second rotor being disposed farther away from said axis of rotation than said inner edges and wherein said axis of rotation is positioned between the outer edges and the inner edges of the inner surfaces of each blade, so that an air passage is defined between the blades;

said inner edges of the blades of said second rotor being spaced apart;

a line extending between said outer edges of said blades of said first rotor being disposed at a non-zero first angle relative to a line extending between said outer edges of said blades of said second rotor;

said rotor assembly being configured to initiate rotation about said axis of rotation by at least one blade of said first rotor acting upon said first end disk and said partition disk or by at least one blade of said second rotor acting upon said second end disk and said partition disk; and said first angle, between the line extending between said outer edges of said blades of said first rotor and the line extending between said outer edges of said blades of said second rotor, being sufficiently large to initiate rotation of said rotor assembly upon wind having a sufficiently high velocity to start rotation of said rotor assembly coming from any direction blowing at said wind turbine, wherein said blades of said first rotor and said second rotor each comprises a substantially concave surface extending between said inner edge and said outer edge, said concave surface comprising a surface area sufficient to rotate said rotor assembly upon wind blowing on said concave surface, wherein said concave surfaces of said blades of said first rotor partially face one another, said inner edges of said blades of said first rotor forming a first gap therebetween configured to direct air between said concave surfaces of said blades of said first rotor, wherein said inner edges of said blades of said first rotor are spaced apart from each other by said first gap, said first gap extending across a line extending between said outer edges of said blades of said first rotor such that said inner edges of said blades of said first rotor do not extend past the line extending between said outer edges of said blades of said first rotor and said inner edges of said blades of said first rotor are offset from the line extending between said outer edges of said blades of said first rotor in a direction toward a perimeter of said disks, wherein said concave surfaces of said blades of said second rotor partially face one another, said inner edges of said blades of said second rotor forming a second gap therebetween configured to direct air between said concave surfaces of said blades of said second rotor, wherein said inner edges of said blades of said second rotor are spaced apart from each other by said second gap, said second gap extending across a line extending between said outer edges of said blades of said second rotor such that said inner edges of said blades of said second rotor do not extend past the line extending between said outer edges of said blades of said second rotor and said inner edges of said blades of said second rotor are offset from the line extending between said outer edges of said blades of said second rotor in a direction toward the perimeter of said disks, wherein said wind turbine further comprises a plurality of rotatable wind-directing members extending at least partially between said first end and said second end of said frame and being disposed circumferentially around said rotor assembly and proximate said outer edges of said blades of said first rotor and said second rotor upon rotation of said rotor assembly, wherein each of said plurality of wind-directing members having an axis of rotation substantially parallel to said axis of rotation of said rotor assembly, wherein the wind-directing members can be rotated in a direction to reduce a cross-sectional area of the wind turbine so as to be capable of transporting said wind turbine in a horizontal position in a shipping vehicle, wherein said wind turbine further comprises a plurality of flexible sails extending at least partially between said first end and said second end of said frame and is disposed circumferentially around said rotor assembly, wherein said outer edges of said blades of said first rotor lie on a circle defining a diameter of said first rotor, wherein said outer edges of said blades of said second rotor lie on a circle defining a diameter of said second rotor, wherein said diameter of said first rotor and said diameter of said second rotor are less than a diameter of said end disks and said partition disk, wherein a straight line distance between said first end disk and said partition disk is larger than said diameter of said first rotor, wherein a straight line distance between said second disk end and said partition disk is larger than said diameter of said second rotor, wherein said inner edges and said outer edges of said blades are substantially parallel to said axis of rotation of said rotor assembly, wherein said plurality of wind-directing members are integral to said frame, wherein each of said plurality of wind-directing members has an axis of rotation substantially parallel to said axis of rotation of said rotor assembly, wherein the wind-directing members can be rotated in a direction to reduce a cross-sectional area of the wind turbine so as to be capable of transporting said turbine in a horizontal position in a shipping vehicle,
wherein said rotor assembly further comprises:
- a third rotor disposed between said first rotor and said second rotor, said third rotor comprising two blades, each blade of said third rotor comprising a first end, a second end opposite said first end, an inner edge, and an outer edge, each of said blades forming a curved partially cylindrical shape between said inner edge and said outer edge; and
- at least one additional partition disk interconnected between said ends of said blades of said third rotor and ends of blades of an adjacent rotor, wherein said outer edges of each of said blades of said third rotor are disposed farther away from said axis of rotation than said inner edges and wherein said axis of rotation is positioned between the outer edges and the inner edges of the inner surfaces of each blade so that an air passage is defined between the blades,
wherein said inner edges of each of said blades of said third rotor are spaced apart,
wherein a line extending between said outer edges of said blades of said third rotor are disposed at a non-zero second angle relative to a line extending between outer edges of said blades of said adjacent rotor,
wherein said second angle, between the line extending between said outer edges of blades of said third rotor and the line extending between said outer edges of said blades of said adjacent rotor, is sufficiently large to initiate rotation of said rotor assembly upon wind having a sufficiently high velocity to start rotation of said rotor assembly coming from any direction blowing at said wind turbine,
wherein said blades, said end disks, and said partition disks each comprise a composite laminate, said composite laminate comprising:
- a first sheet comprising a first face and a second face;
- a second sheet comprising a first face and a second face; and
- a third sheet disposed between said first face of said first sheet and said first face of said second sheet;

wherein said first and said second sheet comprise an organic material;
said third sheet comprises a synthetic fiber material,
wherein said third sheet is in contact with at least a substantial area of said first face of said first sheet and said first face of said second sheet,
wherein said first sheet, said second sheet, and said third sheet are adhered together,
wherein said transportable frame comprises:
- a first structure positioned proximate said first end of said frame;
- a second structure positioned proximate said second end of said frame;
- a first connector interconnected between said first structure and said first end disk along said axis of rotation, said first connector being configured to provide rotation of said first end disk relative to said first structure;
- a second connector interconnected between said second structure and said second end disk along said axis of rotation, said second connector being configured to provide rotation of said second end disk relative to said second structure;
- a plurality of frame members interconnected between said first structure and said second structure;
- a plurality of supports, each of said plurality of supports having a first end connected to said first end of said frame and an opposed second end extending away from said first end of said frame;
- a pair of wheel assemblies rotatably attached to a respective one of said plurality of supports of said frame at said first end of said frame;
- a tow mount operatively attached to said frame at said second end of said frame; and
- at least one fastener connected to said frame at said second end of said frame, wherein said first structure and said second structure have a triangular shape and said plurality of frame members and said plurality of supports are arranged in a triangular configuration,
wherein said transmission is connected to said first structure at said first end of said frame,
wherein said rotor assembly is connected to said transmission by said first connector,
wherein said frame is arranged such that the wind turbine is configured to be movable between a first, horizontal orientation with said first end of said frame and said second end of said frame being disposed substantially horizontally relative to one another and a second, vertical orientation with said first end of said frame and said second end of said frame being disposed substantially vertically relative to one another,
wherein said wheel assemblies are arranged on said respective supports such that when said wind turbine is positioned in said first horizontal orientation, said wheel assemblies are disposed on a ground surface to allow for transportation of said wind turbine,
wherein said tow mount is arranged on said second end of said frame such that when said wind turbine is positioned in said first horizontal orientation, said tow mount is configured to be connected to a towing vehicle, and
wherein said wheel assemblies are arranged on said respective supports such that when said wind turbine is positioned in said second vertical orientation, said wheel assemblies are disposed away from the ground surface.

2. The wind turbine according to claim 1, wherein:
said synthetic fiber material comprises para-aramid synthetic fiber fabric or poly-paraphenylene terephthalamide; and
said organic material is selected from a group consisting of angouma wood, gaboon wood, okoume wood, oak wood, maple wood, and bamboo.

3. The wind turbine according to claim 1, wherein:
said synthetic fiber material comprises a woven para-aramid synthetic fiber fabric or a woven poly-paraphenylene terephthalamide material; and
said organic material comprises bamboo.

4. The wind turbine according to claim 1, wherein:
said plurality of frame members are disposed circumferentially around said rotor assembly; and
said plurality of wind-directing members are integral to said plurality of frame members.

* * * * *